United States Patent

[11] 3,568,922

[72] Inventor Paul M. Pepper
514 E. Schreyer Place, Columbus, Ohio 43214

[21] Appl. No. 674,045
[22] Filed Sept. 18, 1967
[45] Patented Mar. 9, 1971
Continuation of application Ser. No. 450,235, Apr. 7, 1965, Continuation-in-part of application Ser. No. 234,789, Nov. 1, 1962, now abandoned, Continuation-in-part of application Ser. No. 253,229, Jan. 22, 1963, now abandoned.

[54] SLIDE RULE
12 Claims, 16 Drawing Figs.

[52] U.S. Cl. .......... 235/70
[51] Int. Cl. .......... G06g 1/02
[50] Field of Search .......... 235/70

[56] References Cited

UNITED STATES PATENTS 2,138,879 12/1938 Poole .......... 235/70

*Primary Examiner*—Richard B. Wilkinson
*Assistant Examiner*—Lawrence R. Franklin
*Attorney*—Anthony D. Cennamo

ABSTRACT: This invention relates generally to special purpose slide rule mathematical computers and particularly to a slide rule for computing the dimensions and positions of objects appearing on oblique aerial photographs.

PATENTED MAR 9 1971 3,568,922

INVENTOR.
PAUL M. PEPPER
BY
Anthony D. Cennamo

INVENTOR.
PAUL M. PEPPER
BY
Anthony D. Cennamo

PATENTED MAR 9 1971 3,568,922

SHEET 3 OF 6

INVENTOR.
PAUL M. PEPPER
BY
Anthony D. Cennamo

INVENTOR.

BY PAUL M. PEPPER

Anthony D. Cennamo

BODY SIDE 2

INVENTOR.
PAUL M. PEPPER
BY
Anthony D. Cennamo

INVENTOR.
BY PAUL M. PEPPER
Anthony D. Cennamo

SLIDE RULE

This application is a continuation of my copending application, Ser. No. 450,235, filed Apr. 7, 1965, for Slide Rule.

Modern aircraft equipped with multiple camera arrays provide relatively large scale images in the band, usually perpendicular to the line of flight, and that frequently extends from horizon to horizon. There are, in addition, special purpose oblique aircraft cameras—usually with long focal length lenses and large angles of tilt. For the most part, this special purpose oblique aerial photography is subject solely to qualitative interpretation even though there are demands for determining dimensional information from the oblique photographs.

There has been presented in the prior publication the derivation of three computational and two semigraphic schemes for the determination of lengths, heights, and areas from single oblique photographs. The semigraphic schemes employ transparent overlays from which significant precomputed values could be read as a function of the image position on the photograph. In another publication there was presented a series of nomographs by means of which the scale numbers, derived in the first mentioned publication, could be found for any camera installation.

The disadvantage with the prior art method is that of the wide variety of oblique camera applications that makes preparing overlays to cover all possible situations not feasible. Also, the prior art nomographs, even though universally applicable, must be quite large and unwieldy if they are to preserve the necessary accuracy; furthermore, they are subject to considerable wear-and-tear so that their useful life is quite short.

It is accordingly the principal object of the present invention to provide a method and means of computing the dimensions and positions of objects appearing on an oblique aerial photograph.

It is another object of the present invention to provide a method and means of computing the dimensions and positions of objects appearing on an oblique aerial photograph that covers all possible situations.

A further object of the present invention is to provide a slide rule constructed specifically for oblique photocalculations.

Another object of the present invention is to provide a slide rule constructed specifically for oblique photocalculations wherein one setting of the rule can compute one quantity as a function of not more than three other quantities; the number of manipulations is kept to a minimum; and the same set of slide rule scales is usable for all the problems to be solved from the oblique photograph.

Still another object of the present invention is to provide a slide rule for computing the dimensions and positions of objects appearing on an oblique aerial photograph having tilt angles extending from 0° to 95°.

Other objects and features of the present invention will become apparent from the following detailed description when taken in conjunction with the drawings in which.

Figure 13:
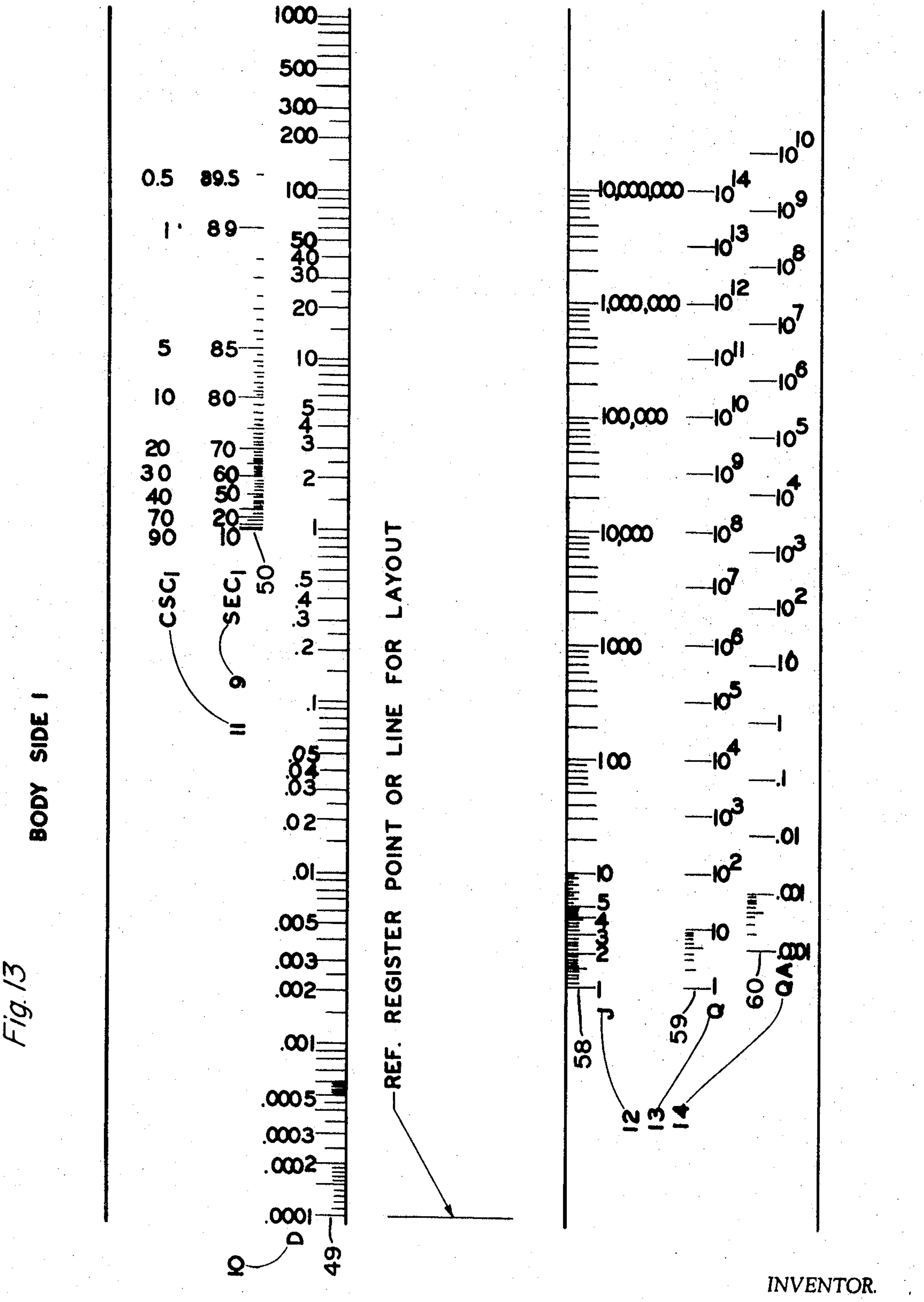
Figure 13A:
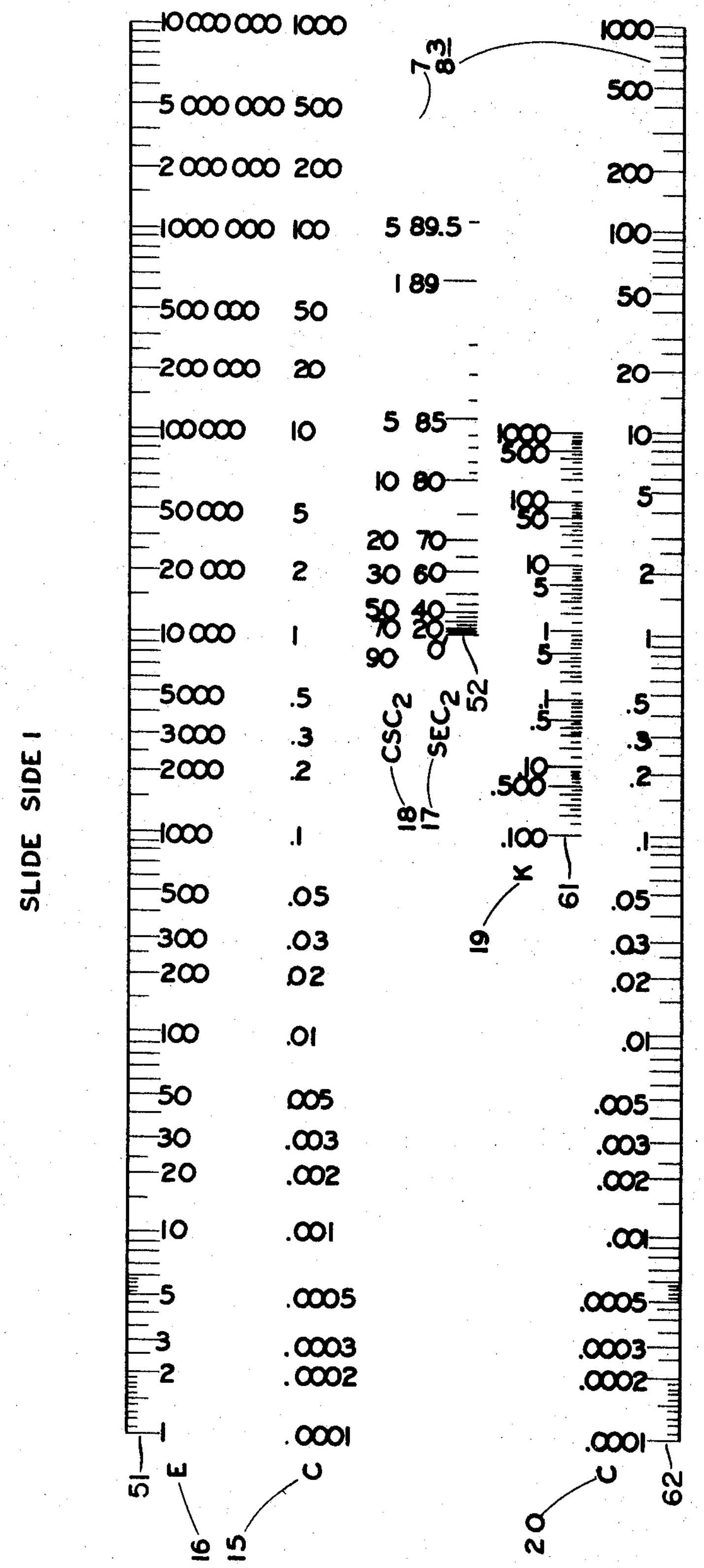
Figure 13B:
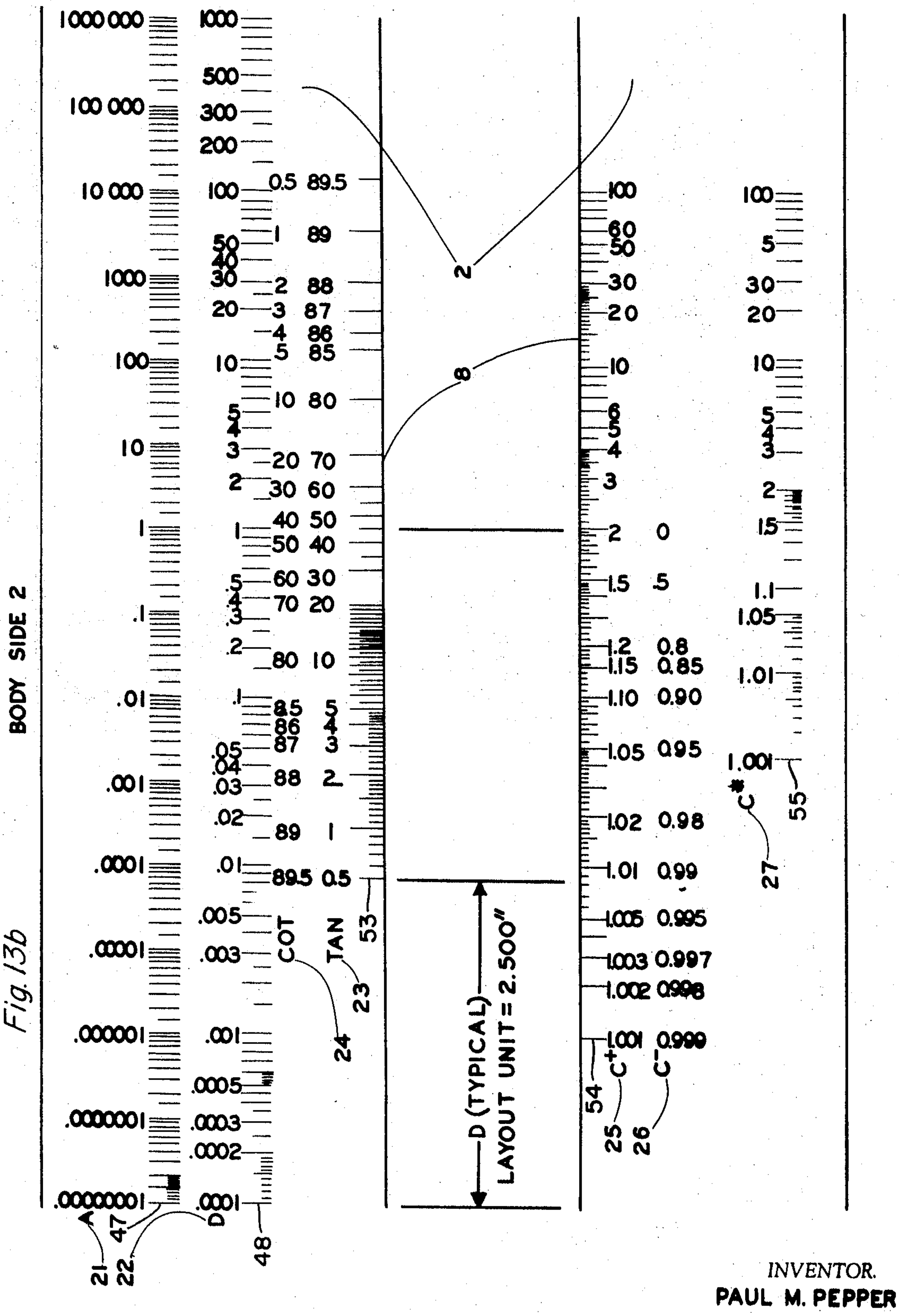
Figure 13C:
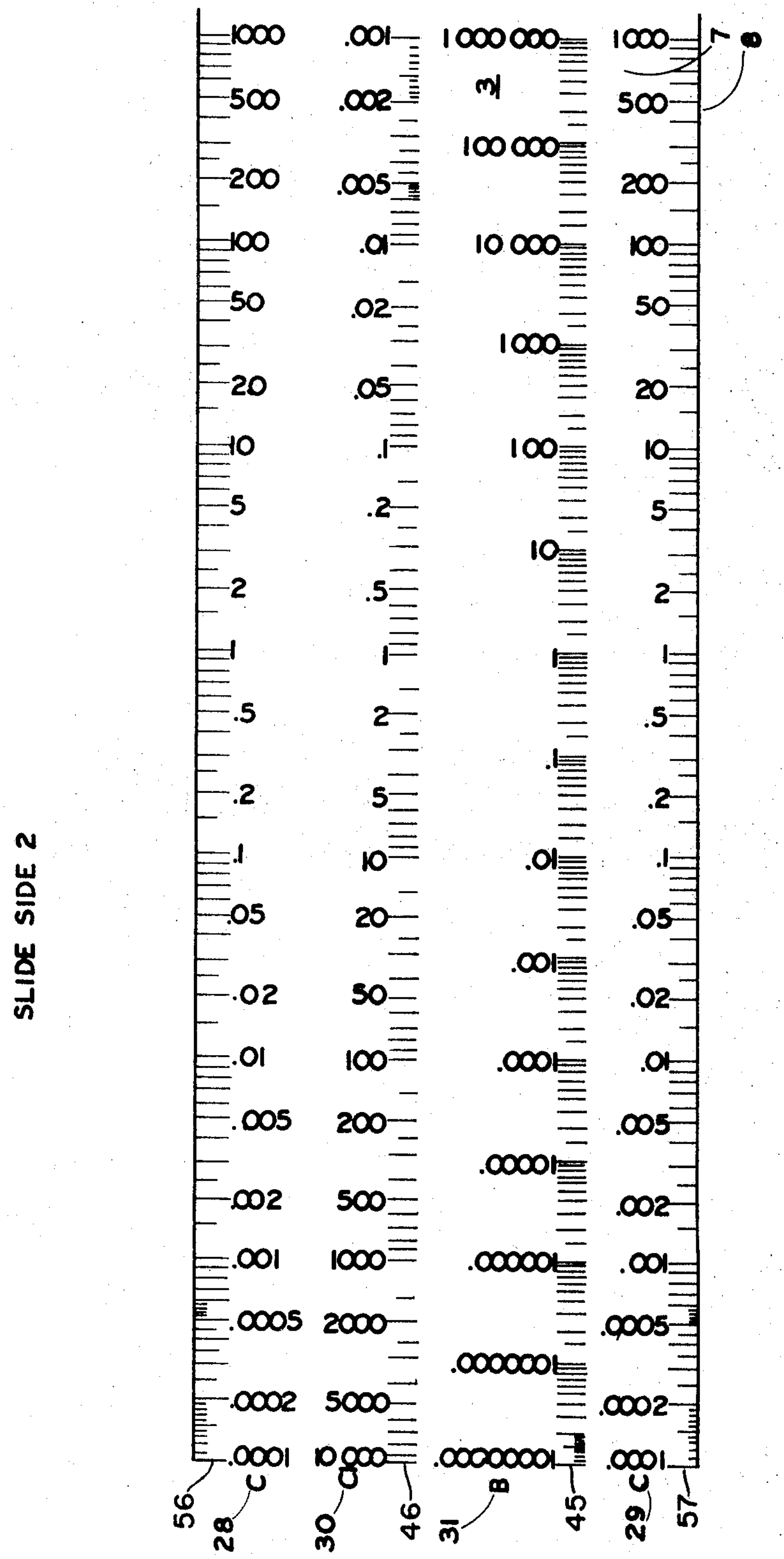

FIGS. 13—13c show a complete layout of one set of scales.

To provide a clearer understanding of the slide rule of the present invention, it is necessary to examine the formulas and to rearrange them as required to reduce the number of manipulations while still retaining the maximum computational accuracy. Oblique photocomputations are essentially concerned with the transformation, under the laws of projective geometry, of image dimensions measured in the photographic system to object dimensions measured in object space. The two coordinate systems are distinct and the relation between them is given by the exterior orientation of the camera at the time the photograph was exposed. The photographic system is an orthogonal right-handed coordinate system having its origin at the principal point of a positive print of the photograph employed. The $xy$ plane is the plane of the photograph, and the $y$ axis coincides with the principal line and its positive direction is upward on the photograph. The principal line is the trace on the photograph of the vertical plane containing the camera axis at the moment of exposure. It passes through the principal point and is perpendicular to the horizon. The $z$ axis coincides with the theoretical position of the camera axis. The only dimension measured in the $z$ direction is the camera focal length $f$, and the formulas are arranged in such a manner that $f$ is always used with a positive sign.

Figure 1:
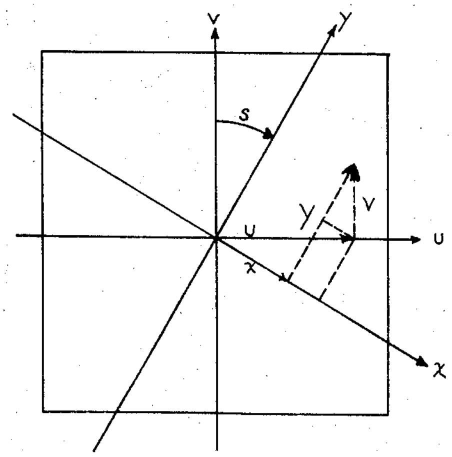
FIG. 1 is the rotation of coordinates in the plane of an oblique photograph.

The usual measuring axes on a photograph are located by the fiducial marks at the edges of the picture area. If this coordinate system is called $uv$, the clockwise positive angle between the $v$ axis and the $+y$ axis is called the angle of swing $s$. With reference to FIG. 1 the $xy$ coordinates are given by standard coordinate rotation formulas:

$$x = u\cos s - v\sin s \qquad (1)$$

$$y = u\sin s + v\cos s \qquad (2)$$

If the $y$ axis is displaced towards the other side of the $v$ axis, the angle $s$ may be taken in the fourth quadrant with the appropriate signs for the trigonometric functions, or $s$ may be considered a negative angle with the appropriate signs for the trigonometric function. Specifically, it may be observed that $uv$ = fiducial coordinate system
$xy$ = oblique photocoordinate system
$oy$ = principal line of oblique photograph
$o$ = principal point
$r$ = any image point
$s$ = angle of swing.

Formulas for oblique photocomputations are expressed in the $xy$ principal line system and in general, it will be easier and more accurate to measure directly in this system than to apply the rotation formulas. However, the coordinate rotation may be computed on the slide rule of the present invention.

The object space coordinate system is a right-handed orthogonal system with its origin at the ground nadir point $V$ of the photograph concerned. The $+Z$ axis coincides with the plumb line from the exposure station to the earth's surface. The $+Y$ axis is the trace of the principal plane of the photograph on the $XY$ plane representing the earth surface.

With the coordinate systems defined as above, the relation between the two systems is defined by two parameters;

$H$ = the $Z$ coordinate of the camera lens at the moment of exposure $t$ = the angle between the $+Z$ axis and the $+z$ axis at the moment of exposure. This angle is conventionally referred to as "tilt." The complement of $t$ is the depression angle $\delta$ which is sometimes used instead of tilt.

Figure 2:
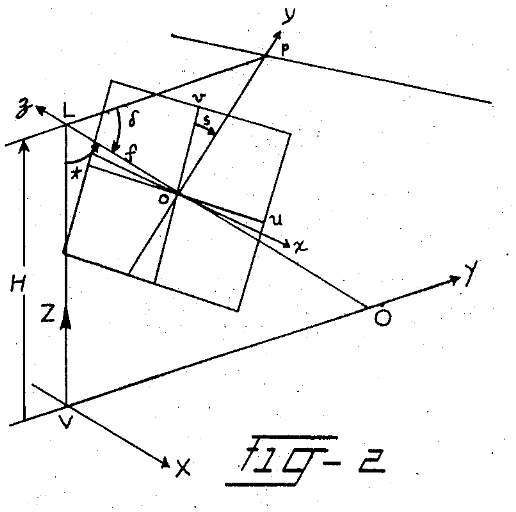
FIG. 2 is the rotation between photo and object space coordinate systems.

These relations are illustrated in FIG. 2 where $uv$ = fiducial axis system
$xyz$ = oblique photo axis system
$XYZ$ = object space coordinate system
$s$ = angle of swing $L$ = exposure station
$oL = f$ = camera focal length
$VL = H$ = altitude of exposure station above horizontal plane through object
$t$ = tilt angle
$\delta$ = depression angle
$pLVOop$ = principal plane of photograph.

A photograph having less than 5° tilt may be treated as a vertical photograph without great error, therefore, the first formulation of the computational equations is designed specifically for the range of $5° \leq t \leq 85°$. The ranges from 0° to 5° and from 85° to 95°, which sometimes require special rearrangements, will be treated separately.

The length of a horizontal line $AB$ on the ground may be found from $$AB = \frac{H}{v_a v_b} \sqrt{(v_a x_b - v_b x_a)^2 + f^2 (y_b - y_a)^2} \qquad (3)$$

in which $$v_i = f \cos t - y_i \sin t \;. \qquad (4)$$

We elect to use, instead of $v_a$ and $v_b$, the value $$v_o = f \cos t - y_o \sin t$$

computed for the mid value of $y$ $$y_o = \frac{y_a + y_b}{2}$$

Furthermore, we set
$\Delta x = |(x_b - x_a)|$
$\Delta y = |(y_b - y_a)|$
$l = \sqrt{\Delta x^2 + \Delta y^2}$ = image length on photograph
$L$ = object length on ground.

Making these substitutions in formula (3), we obtain $$L = \frac{H}{v_o 2} \sqrt{v_o^2 \Delta x^2 + f^2 \Delta y^2}$$

or $$L = \frac{H}{v_o} \sqrt{\Delta x^2 + \frac{f^2 \Delta y^2}{v_o^2}} \qquad (5)$$

If we set $$c_o = 1 - \frac{y_o}{f} \tan t \qquad (6)$$

then $$v_o = c_o f \cos t.$$

Substituting this in formula (5) gives $$L = \frac{H}{c_o f \cos t} \sqrt{\Delta x^2 + \frac{f^2 \Delta y^2}{c_o^2 f^2 \cos^2 t}}$$

$$L = \frac{H \sec t}{c_o f} \sqrt{\Delta x^2 + \frac{\Delta y^2 \sec^2 t}{c_o^2}} \qquad (7)$$

Now we let $$\sec s = \frac{\sec t}{c_o} \qquad (8)$$

where $s$ is an auxiliary angle (not related to the swing angle). Note that this substitution is valid only if $c_o \leq \sec t$. Making this substitution in formula (7) we obtain or $$L = \frac{H \sec t}{c_o f} \sqrt{\Delta x^2 + \Delta y^2 (1 + \tan^2 s)}$$

$$= \frac{H \sec t}{c_o f} \sqrt{l^2 + \Delta y^2 \tan^2 s}$$

or $$L = \frac{H \sec t}{f} \cdot \frac{l}{c_o} \sqrt{1 + \frac{\Delta y^2 \tan^2 s}{l^2}} \qquad (9)$$

which is the final form for computation. To organize the computation we use equation (6) and define $$N = \frac{H \sec t}{f} = \text{constant for any one photograph} \qquad (10)$$

$$c^*_y = \sqrt{1 + \frac{\Delta y^2 \tan^2 s}{l^2}} \qquad (11)$$

$$l^*_y = \frac{l c^*_y}{c_o}$$

Then equation (9) becomes $$L = \frac{N l^*_y}{1}$$

which is the final form for computation. It will be noted that each of these quantities is obtained as a function of not more than three other quantities. It will later be shown that scales can be constructed so that each of these computations can be done by one setting of the slide rule.

For the case when $c_o$  sec $t$, we let $$\sec u = \frac{c_o}{\sec t}, \qquad (12)$$

where $u$ is another auxiliary angle (not related to the photographic coordinate $u$). Substituting (12) into formula (7) gives $$L = \frac{H \sec t}{c_o f} \sqrt{x^2 + \frac{\Delta y^2}{(1 + \tan^2 u)}}$$

$$= \frac{H \sec t}{c_o f} \sqrt{\frac{\Delta x^2 + \Delta y^2 + \Delta x^2 \tan^2 u}{\sec^2 u}}$$

or $$L = \frac{H \sec t}{f} \cdot \frac{l}{c_o \sec u} \sqrt{1 + \frac{\Delta x^2 \tan^2 u}{l^2}} \qquad (13)$$

If we now define $$c_x^* = \sqrt{1 + \frac{x^2 \tan^2 u}{l^2}} \qquad (14)$$

$$l^*_x = \frac{l c^*_x}{c_o}$$

It is apparent that formula (13) may be written $$L = \frac{N l^*_x}{\sec u}$$

It is only necessary therefore to have an unambiguous decision as to whether formula (8) or (12) applies. This is readily accomplished in the design of the slide rule.

For future reference a quantity of the form $$1 \pm m/n \tan \theta \qquad (15)$$

will be designated as $\bar{c}$ with an appropriate subscript. Likewise a quantity of the form $$1 \pm m/n \cot \theta \qquad (16)$$

which uses the cofunction will be designated as $c$ with an appropriate subscript. Similarly a quantity of the form $$\sqrt{1 + \frac{m^2 \tan^2 \theta}{n^2}} \qquad (17)$$

will be designated as $c^*$ with an appropriate subscript.

The use of an average $v_o$ instead of $v_a$ and $v_b$ in equation (3) has been suggested. An extensive error analysis of the effect of this substitution has indicated that the substitution is always justified when the tilt is small. It is also reasonably justified for large tilts—if the image to be measured is in the lower section of the photograph, and the difference in the $y$ coordinates of the end points is not large. However, for images near the horizon, the substitution may lead to serious error unless the $y$ coordinate difference is quite small. In any case where the $y$ coordinate difference is fairly large, it is recommended that the image be broken into sections, and each section be computed separately. Furthermore, the accuracy of any result computed by the formula given may be improved by multiplying it by the ratio $c_o^2/c_a c_b$. The $c$'s are readily obtained from the slide rule.

Formula (3) as given is geometrically correct. However, it has not been found possible to adapt it to slide rule computation without an unreasonable number of manipulations and several side additions or subtractions.

The formula for the height of a vertical object is given as $$h=\frac{Hf(y_t-y_b)}{v_b g_t} \qquad (18)$$

in which $y_t = y$ coordinate of image of top of object
$y_b = y$ coordinate of image of bottom of object
$v_b = f\cos t - y_b \sin t$
$g_t = f\sin t + y_t \cos t$ If we let $$\Delta y = |(y_t -_b)|$$

this formula may be rearranged as follows $$h=\frac{\mathrm{Hf}\Delta y}{(f\cos t-y_b\sin t)(f\sin t+y_t\cos t)}$$

$$=\frac{\mathrm{Hf}\Delta y}{f\cos t\left(1-\frac{y_0\tan t}{f}\right)f\sin t\left(1+\frac{y_t\cot t}{f}\right)} \qquad (19)$$

or $$h=\frac{\mathrm{H}\sec \mathrm{t}}{f}\cdot\frac{\Delta \mathrm{y}\csc \mathrm{t}}{\left(1+\frac{y_t\cot \mathrm{t}}{f}\right)}\cdot\frac{1}{\left(1-\frac{y_b\tan \mathrm{t}}{f}\right)}$$

With the previous designations, and with the definition $$\Delta y^*=\frac{\Delta \mathrm{y}\csc \mathrm{t}}{\bar{c}_t} \qquad (20)$$

equation (19) becomes $$h=N\frac{\Delta \mathrm{y}^*}{c_b}$$

On oblique photography, particularly that made with long focal length lenses at considerable tilts, the difference in $y$ coordinates for a vertical object will generally be considerably greater than the difference in $x$ coordinates. For this situation the computation indicated by formula (19) is most suitable. However, for obliques with small tilts, images near a line through the photographic nadir point and parallel to the $x$ axis may have a larger $x$ coordinate difference. A formula for this case is easily derived by reference to FIG. 3.

The images (extended) of all vertical objects pass through the nadir point of the photograph. The distance *on* from the principal point to the nadir point is $$on = f\tan t.$$

Figure 3:
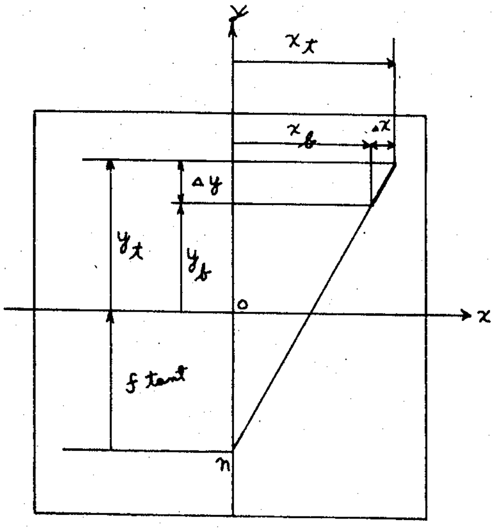
FIG. 3 is the relation between $\Delta x$ and $\Delta y$ for the image of a vertical object.

Consequently, from Figure 3 we obtain $$\frac{\mathrm{f}\tan \mathrm{t}+\mathrm{yt}}{x_t}=\frac{y_t-y_b}{x_t-x_b}=\frac{\Delta \mathrm{y}}{\Delta x}$$

This may be solved for $\Delta y$ $$\Delta y=\frac{\Delta \mathrm{x}(\mathrm{f}\tan \mathrm{t}+\mathrm{y}_t)}{x_t},$$

which may be substituted into formula (18) with the result $$h=\frac{\mathrm{Hf}}{v_b g_t}\frac{\Delta \mathrm{x}(\mathrm{f}\tan \mathrm{t}+\mathrm{y}_t}{x_t}.$$

Rearranging this and substituting the expression for $g_t$ we obtain $$h=\frac{\mathrm{Hf}\Delta \mathrm{x}}{v_b x_t}\cdot\frac{(\mathrm{f}\sin \mathrm{t}+\mathrm{y}_t\cos \mathrm{t})\sec \mathrm{t}}{(f\sin t+y_t\cos t)}$$

$$h=\frac{\mathrm{Hf}\sec \mathrm{t}}{v_b x_t}\Delta x.$$

For slide rule computation this formula is rearranged as follows $$h=\frac{\mathrm{Hf}\sec \mathrm{t}\Delta \mathrm{x}}{(f\cos t-y_b\sin t)x_t}$$

$$=\frac{Hf\sec t\Delta x}{(f\cos t)\left(1-\frac{y_b\tan t}{f}\right)x_t}$$

$$=\frac{H\sec t}{f}\cdot\frac{f}{x_t}\cdot\frac{\Delta x\sec t}{1-\frac{y_b\tan t}{f}} \qquad (21)$$

With the definitions $$\Delta x^*=\frac{\Delta x\sec t}{c_b}$$

$$\rho=\frac{f\Delta x^*}{x_t}$$

it is apparent that $h$ can be computed as $$h=N\cdot\rho.$$

The formula for computation of a horizontal area is given as $$A=\frac{H^2 f\cdot a}{(f\cos t-y_g\sin t)^3} \qquad (22)$$

in which $A$ = the area on the ground
$a$ = the corresponding area on the photograph
$y_g$ = the $y$ coordinate of the center of gravity of the photographic area.

This formula may be rewritten as $$A=\frac{H^2 fa}{f\cos^3 t\left(1-\frac{y_g}{f}\tan t\right)^3}$$

$$=\left(\frac{H\sec t}{f}\right)^2\frac{a\sec t}{\left(1-\frac{y_g}{f}\tan t\right)^3} \qquad (23)$$

If we set $$a^*=a\sec t$$

we may write formula (23)

$$A=\frac{N^2 a^*}{c_g^3} \qquad (24)$$

The formula for the $X$ coordinate of a point in the object space coordinate system is also illustrated in FIG. 2 where $$X=\frac{H\cdot x}{f\cos t-y\sin t} \qquad (25)$$

The formula may be rewritten $$X=\frac{H\sec t}{f}\frac{x}{1-\frac{y\tan t}{f}} \qquad (26)$$

In the notation employed for the slide rule computation, this becomes $$X=\frac{Nx}{c_y}$$

The formula for the $Y$ coordinate is $$Y=H\frac{(f\sin t+y\cos t)}{(f\cos t-y\sin t)} \qquad (27)$$

This formula is rearranged as follows $$Y=H\cdot\frac{f\sin t\left(1+\frac{y\cot t}{f}\right)}{f\cos t\left(1-\frac{y\tan t}{f}\right)} \qquad (28)$$

In the notation employed, this becomes $$Y=H\tan t\frac{\bar{c}_y}{c_y}$$

For ease in slide rule computation we define $$C=\overline{c}_y \tan t, \qquad (29)$$

whence $$Y=\frac{HC}{c_y}.$$

The horizontal distance $D$ from the nadir point is given by $$D=\sqrt{X^2+Y^2} \qquad (30)$$

For slide rule computation this may be rearranged. If $X \geq Y$ $$D=X\sqrt{1+\frac{Y^2}{X^2}\tan^2 45^\circ}$$

whereas if $Y > X$ $$D=Y\sqrt{1+\frac{X^2}{Y^2}\tan^2 45^\circ}$$

In both cases the radical is of the form $c^*$, and hence may be computed by the same slide rule scales.

Obviously, if the $X$ and $Y$ coordinates of two points are computed by any method, the projected horizontal length $L$ of the line between them is given by $$L=\sqrt{\Delta X^2+\Delta Y^2}.$$

This equation can be treated just as equation (30) with $\Delta X$, $\Delta Y$, and $L$ replacing $X$, $Y$, and $D$, respectively. Computing the length in this manner from $\Delta X$ and $\Delta Y$ is preferred only if the two end points are at considerably different terrain elevations. In such a case, a different value of $H$ (terrain clearance) would be used in the computation of the object space coordinates for each of the points.

The formulas in the preceding sections have employed sec $t$ and tan $t$ as fundamental terms. When $t$ approaches 90°, these functions approach infinity, and the formulas become indeterminate. This has two results on the slide rule: first, the scales become of infinite length; second, for values of $t$ approaching 90°, computing accuracy is lost. To circumvent this situation, when $85^\circ \leq t \leq 95^\circ$, the formulas are recast in terms of the depression angle $\delta$, and the necessary rearrangements are made to eliminate the indeterminate forms. The depression angle $\delta$ is positive when measured down from the horizon, negative when measured upward. It must be appreciated that objects whose images appear near the horizon on a photograph are poorly determined geometrically. No rearrangement of formulas can circumvent this situation.

When the tilt $t$ is near 90°, formulas (6) and (7), which concern the case $c_o \leq \sec t$, break down since both tan $t$ and sec $t$ approach infinity. To eliminate this difficulty we use a different method of computing sec $s$. From formulas (6) and (8) we obtain $$\sec s=\frac{\sec t}{c_o}$$

$$=\frac{\sec t}{1-\frac{y_o}{f}\tan t}$$

$$=\frac{1}{\cos t-\frac{y_o}{f}\sin t}$$

Writing this in terms of the depression angle $\delta$, we obtain $$\sec s=\frac{1}{\sin\delta-\frac{y_o}{f}\cos\delta}$$

We designate $$P=\sin\delta-\frac{y_o}{f}\cos\delta \qquad (31)$$

Each term of $P$ can be computed by one setting of the slide rule with proper attention to the algebraic signs. The quantity $P$ is then determined by a side addition or subtraction not utilizing the slide rule.

The auxiliary angle $s$ is then obtained from $$\sec s=\frac{1}{p}.$$

Making these substitutions in equation (9) we obtain $$L=\frac{H}{f}\cdot\frac{l}{p}\sqrt{1+\frac{\Delta y^2\tan^2 s}{l^2}} \qquad (32)$$

For slide rule computation we organize this formula as follows $$Q_1=\frac{l^c y^*}{P}$$

$$L=\frac{HQ_1}{f}.$$

The quantity $P$ is very small, if and only if the image is close to the horizon, where the determination of the length is geometrically very poor. The case distinction $c_o \leq \sec t$ becomes $P \leq 1$.

For the alternate case when $c_o \geq \sec t$, that is $P \geq 1$, we find from equation (12)

$$\sec u=\frac{c_o}{\sec t}=\frac{\left(1-\frac{y_o}{f}\tan t\right)}{\sec t}$$

$$=\cos t-\frac{y_o}{f}\sin t$$

$$=\sin\delta-\frac{y_o}{f}\cos\delta$$

or $$\sec u=P.$$

Formula (13) then becomes $$L=\frac{H}{f}\frac{l}{P^2}\sqrt{1+\frac{\Delta x^2\tan^2 u}{l^2}} \qquad (33)$$

which is organized for slide rule computation as follows $$Q_2=\frac{lc_x^*}{P}$$

$$R=\frac{Q_2}{P}$$

$$L=\frac{HR}{f}$$

The precaution against large values of $\Delta Y$ as described above is particularly applicable to computations with photographs having these large values of tilt. Because of the approximation made in the assumption of an average $c_o$, no particular simplification is obtained for the case when the depression angle is exactly 0°.

At tilts near 90°, formula (19) for a vertical height becomes indeterminate. Multiplying numerator and denominator of equation (19) by cot $t$, we obtain $$h=\frac{H\csc t}{f}\cdot\frac{\Delta y\csc t}{\left(1+\frac{y_t}{f}\cot t\right)}\cdot\frac{1}{\cot t\left(1-\frac{y_b}{f}\tan t\right)}$$

Writing this in terms of the depression angle we obtain $$h=\frac{H\sec\delta}{f}\cdot\frac{\Delta y\sec\delta}{\left(1+\frac{y_t}{f}\tan\delta\right)}\cdot\frac{1}{\tan\delta\left(1-\frac{y_b}{f}\cot\delta\right)}. \qquad (34)$$

The set of computing formulas then becomes $$N\delta=\frac{H\sec\delta}{f}$$

$$\overline{c}_b=\left(1-\frac{y_b}{f}\cot\delta\right)$$

$$c_t=\left(1+\frac{y_t}{f}\tan\delta\right)$$

$$S_b=\overline{c}_b\tan\delta=\tan\delta-\frac{y_b}{f} \qquad (35)$$

$$\Delta y^*=\frac{\Delta y\sec\delta}{c_t}$$

and finally $$h=\frac{N\delta\Delta y^*}{S_b}$$

The depression angle very near 0°, the term $\overline{c}_b$ may not be computable on the slide rule. In such a case the quantity $S_b$ should be computed from the second form of equation (35). The value of tan δ can be found from the rule and the quotient $y_b/f$ can be computed by one operation. The quantity $S_b$ is then found by a side operation not using the slide rule. When $-5°\leq\delta\leq 5°$ and $|y|\leq f$, the image of a vertical object will always have $|\Delta x|\leq|\Delta y|$. Consequently, no rearrangement of formula (21) is required. When the depression angle is exactly 0°, and $S_b$ is expressed as the second form in equation (35), it will be observed that equation (34) reduces to $$h=\frac{-H\Delta y}{y_b} \qquad (36)$$

which may be computed in one operation on the slide rule.

As $t$ approaches 90°, formula (23) for a horizontal area becomes indeterminate. Multiplying numerator and denominator by $\cot^3 t$, and expressing the result in terms of the depression angle, we obtain $$A=\frac{H^2}{f^2}\,\frac{\sec^3\delta\cdot a}{\left(\tan\delta-\frac{y_g}{f}\right)^3} \qquad (37)$$

From the slide rule tan δ can be determined until −0.5° δ 0.5°. Beyond this point δ may be considered 0°, and the special formulas for that case may be employed. Otherwise the quantity in the parentheses is of the same form as equation (35), and may be computed with the slide rule and one side operation. Formula (37) may then be organized as $$A=\frac{N\delta^2 a\delta^*}{S_g^{\,3}}$$

in which $$a\delta^*=a\sec\delta,\ N\delta=\frac{H}{f}\sec\delta.$$

Thus $A$ may be computed on the slide rule using the same scales employed in the usual case.

For the case when δ is exactly 0°, formula (37) becomes $$A=\frac{H^2}{F^2}\cdot\frac{a}{\left(\frac{-y_g}{f}\right)^3} \qquad (38)$$

which for slide rule computation may be organized as follows $$N\delta=\frac{H}{f} \qquad T=\frac{-y_g}{f}$$

$$A=\frac{N\delta^2\cdot a}{T^3}.$$

Formula (25), which gives the $X$ coordinate of a point in the object space coordinate system, may be rewritten in terms of the depression angle as $$X=\frac{H\cdot x}{f\sin\delta-y\cos\delta}.$$

This may be rearranged as $$X=\frac{H\sec\delta x}{-y\left(1-\frac{f}{y}\tan\delta\right)} \qquad (39)$$

For slide rule computation this is organized as follows $$N_2=\frac{H\sec\delta}{-y}$$

$$c_f=1-\frac{f}{y}\tan\delta$$

$$X=\frac{N_2 x}{c_f}.$$

Formula (27) for the $Y$ coordinate in object space may be expressed in terms of the depression angle as $$Y=H\frac{(f\cos\delta+y\sin\delta)}{(f\sin\delta-y\cos\delta)}.$$

This may be rearranged to give $$Y=\frac{Hf}{-y}\frac{\left(1+\frac{y}{f}\tan\delta\right)}{\left(1-\frac{f}{y}\tan\delta\right)}. \qquad (40)$$

For slide rule computation this is organized as $$N_3=\frac{Hf}{-y}$$

$$c_y=1+\frac{y}{f}\tan\delta$$

$$c_f=1-\frac{f}{y}\tan\delta$$

$$Y=\frac{N_3 c_y}{c_f}.$$

When δ 0 and the $y$ coordinate of the image point is 0, the denominator in both equations (39) and (40) becomes indeterminate. Consequently, when the $y$ coordinate is quite small, the denominators must be computed by the alternate form $$U=f\tan\delta-y$$

which requires one setting on the slide rule and one side computation.

Then the $X$ coordinate is given by $$X=\frac{H\sec\delta x}{U}$$

and the $Y$ coordinate by $$Y=\frac{Hf\,c_y}{U}$$

When the depression angle is exactly 0°, formulas (39) and (40) reduce to $$X=\frac{Hx}{-y}$$

and $$Y=\frac{Hf}{-y}$$

each of which can be computed in one operation of the slide rule.

Within the computing accuracy usually required by photointerpreters, photographs with tilts less than 5° may usually be considered as vertical, and the simple formulas for $t=0°$ may be applied. However, if better accuracy is required, the special purpose slide rule of the present invention may be used, and the following presents the applicable formulas. When tilt is small, formulas (9) and (13) may be used without change. As a matter of fact the formulas yield their best accuracy under this condition. When tilt is exactly 0°, both formulas (9) and (13) reduce to the simple form $$L=\frac{Hl}{f}$$

which is readily computed in one setting of the slide rule.

When the tilt approaches 0°, formula (19) becomes indeterminate since both csc $t$ and cot $t$ approach infinity. This difficulty is eliminated by multiplying numerator and denominator by tan $t$, with the result $$a=\frac{H\sec t}{f}\cdot\frac{1}{\tan t\left(1+\frac{y_t\cot t}{f}\right)}\cdot\frac{\Delta y\sec t}{\left(1-\frac{y_b\tan t}{f}\right)} \qquad (41)$$

The set of formulas for computation becomes $$N=\frac{H\sec t}{f}$$

$$c_b=1-\frac{y_b}{f}\tan t$$

$$\bar{c}_t=1+\frac{y_t}{f}\cot t$$

$$y^*=\frac{\Delta y\sec t}{c_b}$$

$$V=\bar{c}_b\tan t=\tan t+\frac{y_t}{f}$$

$$h=\frac{N\Delta y^*}{y} \qquad (42)$$

When $c_t$ is not computable on the slide rule, the angle $t$ is very close to 0°, and formula for a vertical photo may be used. Alternatively, the quantity $V$ may be determined from the second form of equation (42). This may be done in two slide rule settings and a side computation.

No difficulty is encountered at small tilts with formula (21), which gives the height as a function of the $x$ coordinate difference of the image.

When $t$ is exactly 0°, and $V$ is given by the second form of equation (42), equation (41) reduces to $$h=H\frac{\Delta y}{y_t} \qquad (43)$$

Similarly, equation (21) reduces to $$h=H\frac{\Delta x}{x_t} \qquad (44)$$

By reference to FIG. 3, it may be seen that $$\frac{\Delta x}{x_t}=\frac{\Delta y}{y_t+f\tan t}=\frac{l}{r}$$

which for a vertical picture becomes $$\frac{\Delta x}{x_t}=\frac{\Delta y}{y_t}=\frac{l}{r}$$

so that both formulas (43) and (44) may be written $$h=H\frac{l}{r}$$

which is the familiar relief displacement formula for vertical photos.

No difficulty is experienced with formula (23) for a horizontal area as $t$ approaches 0°. When $t$ is exactly 0°, formula (23) becomes $$A=\left(\frac{H}{f}\right)^2 a \qquad (45)$$

which is readily computed on the slide rule.

No difficulty is encountered in computing $X$ from formula (26) when $t$ approaches 0°. However, the numerator in equation (28) for the $Y$ coordinate becomes indeterminate. To avoid this difficulty, we rearrange equation (29) as follows $$c=\bar{c}_y\tan t=\tan t\left(1+\frac{y\cot t}{f}\right)$$

$$c=\tan t+\frac{y}{f} \qquad (46)$$

If the point whose $Y$ coordinate is sought does not lie on the line $y=0$, this may be rewritten in the form $$C=\frac{y}{f}\left(1+\frac{f}{y}\tan t\right)=\frac{y}{f}c_t$$

The $Y$ coordinate is then given by $$Y=\frac{HC}{c_y}=\frac{H}{f}\cdot\frac{c_t}{c_y}\cdot y \qquad (47)$$

When the $y$ coordinate is very close to zero, $C$ may be computed from equation (46).

When $t=0°$, formulas (25) and (27) become $$X=\frac{H}{f}x$$

and $$v=\frac{H}{f}y.$$

As mentioned in the above, it is recommended that photographic measurements always be made directly in the $xy$ principal line coordinate system. When measurements are made in the $uv$ fiducial coordinate system they must be rotated by means of formulas (1) and (2). Although these formulas can be rearranged for more direct slide rule computation, special cases arise when either $u$, $v$, or $s$ are small. Consequently it is recommended that each term be computed separately on the slide rule. Then a side computation may be made to determine the final coordinates.

In particular, a slide rule can be constructed to perform the general operation of finding any one of the three quantities $a$, $b$, $c$ when the other two are known, provided only that there exists a relation of one of the forms $$f(a)\cdot g(b)=h(c) \qquad (50)$$

or $$F(a)+G(b)=H(c) \qquad (51)$$

wherein $f(a)$, $g(b)$, and $h(c)$ are real positive functions or $F(a)$, $G(b)$, and $H(c)$ are real positive or negative functions of the given quantities.

The existence of an equation of the form (50) implies the existence of one of the form (51), as can be seen by letting $$F(a)=\log_k f(a),\ G(b)=\log_k g(b),\ H(c)=\log_k h(c),$$

where $k$ is any real positive constant other than 1. This allows one to rewrite equation (51) in the form $$\log_k f(a)+\log_k g(b)=\log_k h(c),$$

from which (50) follows at once since the logarithm of a product is the sum of the logarithms.

Similarly, if an equation of the form (51) exists, it is possible to derive one of the form (50) from it. If $k$ is any positive number different from 1, the relation (51) implies the equivalent relation $$k^{F(a)+G(b)}=k^{H(c)}$$

which, by the law of exponents, is equivalent to $$k^{F(a)}\cdot k^{G(b)}=k^{H(c)}.$$

By setting $$f(a)=k^{F(a)},\ g(b)=k^{G(b)},\ h(c)=k^{H(c)}$$

this becomes an equation of the form (50).

Figure 4:
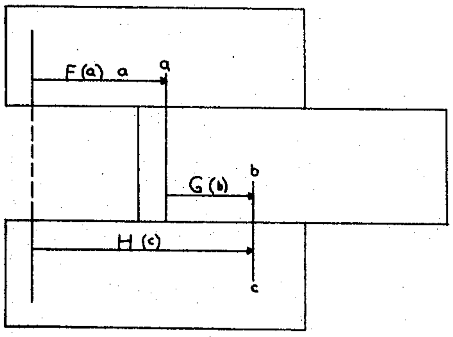
FIG. 4 is a slide rule arrangement for computing one quantity from two other related quantities.

It is convenient from a designer's point of view to use the equation of the form (51), since it can be regarded as a vector equation and be translated directly into mechanical addition on a slide rule, as is shown in FIG. 4.

The directed length of the vector $F(a)$ is measured from a register line on the body. The terminus of the vector $F(a)$ is located by a graduation labeled $\underline{a}$ (not $F(a)$). Similarly, the vector $H(c)$ is laid off on the body from the same register line and labeled $\underline{c}$. Finally, the vector $G(b)$ is laid off on the slide and its terminus marked by a graduation labeled $\underline{b}$. When graduations are placed for suitable sets of values of $a$, $b$, and $c$, the body will contain two scales and the slide one scale. These scales are marked with the numerical values of $a$, $b$, and $c$, respectively, and may be used to perform the desired computation mechanically.

The operation described above can be generalized to four functions, $F(a)$, $G(b)$, $H(c)$, and $K(d)$, provided only that a relation of the form $$F(a)-G(b)+H(c)-K(d)=0 \qquad (52)$$

exists among the four variables $a$, $b$, $d$, $c$, with $F$, $G$, $H$, and $K$ real functions of the respective variables.

Figure 5:
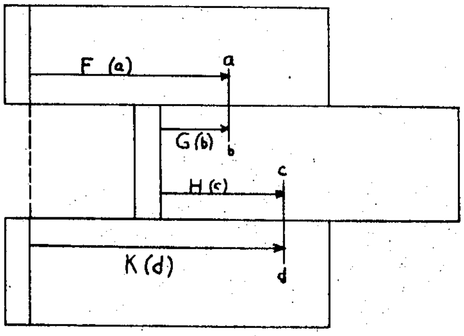
FIG. 5 is a slide rule arrangement for computing one quantity from three other related quantities.

In this case, the vector equation (52) is directly translated into a mechanical operation by means of the diagram of FIG. 5.

Note that such an arrangement permits the computation of any one of the four quantities from the other three with the same ease as the previous arrangement permitted the computation of one quantity from just two other related quantities. Thus the number of operations will be minimized if, in computing a lengthy formula, three quantities can be combined at each step to yield a fourth. This principle is followed in the design of the slide rule of the present invention.

One further method to help minimize the number of manipulations is to arrange the scales so that as many computational results as possible may be read at one setting of the slide. For example, suppose the four variables in equation (55) consist, in some order, of the camers's focal length $f$, the tilt $t$ of the camera's principal axis at the time of the exposure of the photograph, a measurement of a length $\Delta y$ on the photograph, and a quantity $c$ to be computed. It would be desirable to arrange the equation in such a way that $a$ and $b$ are the two quantities, tilt and focal length, which depend only on the circumstances under which the photograph was taken. If this is done, then as long as only one photograph is studied, the position of the slide along the body will remain fixed as different measurements of lengths $\Delta y$ come under consideration, no matter where the lengths $\Delta y$ occur on the photograph. Thus the different values of the desired quantity $c$ to be computed corresponding to the various values of the measurements $\Delta y$ can all be determined with a single setting of the slide. This principle also is followed in all phases of the design of the slide rule.

Unfortunately, not every equation relating four variables can be arranged into an equation of the design of the type of equation (52). One of the principal tasks of the design of the slide rule of the present invention is to rearrange the pertinent mathematical relations in such a way as to get them to conform to this type. To be able to do so required the substitution of approximate formulas in some instances.

In designing the slide rule, three types of inaccuracies which can occur in computational work were considered. The first type of inaccuracy results from the intrinsic inability of the scale graduations to give more than a certain number of significant figures in the result. Each additional significant figure which one requires multiplies the length of the scale by 10. Thus, it is desirable to carry no more significant figures in the computations than are warranted by the data. The fewer significant figures carried, the shorter the scale may be. It is desired to solve the problems within 5 to 10 percent error. Not much greater accuracy can be expected from the data. Hence the choice of retaining two to three significant figures is made here. Two when the first digit is 5 or more and three when the first digit is less than 5.

The second type of inaccuracy considered is that of misreading of numerical values from the scales. Special attention has been given to designing the graduation styles so that they will not be "error prone."

The third type of inaccuracy considered is that of mislocation of decimal points. To avoid requiring the operator to shift decimal points in certain computations, thus risking the commission of errors, the slide rule has been designed with enough length to cover the desired range without decimal point shifts.

Also, certain scales were duplicated on the slide and on the body of the rule as a matter of convenience rather than necessity. This is similar to the duplication of the $D$ scale on the two sides of the ordinary 10 inch long log slide rules. Here there is, however, an additional reason of accuracy, for if a cursor with hairlines on both sides gets out of adjustment, the duplication of scales in such a way as to avoid the necessity of making settings on one side of the rule and readings on the other eliminates a major source of error. Thus the principle was followed, that each computation should be carried out on a single side of the slide rule and in such a way that the use of the hairline is, insofar as possible, confined to making alignments between adjacent scales or scales as nearly adjacent to each other as possible.

In order to determine the totality and arrangement of the scales which are necessary or desirable on the slide rule, it is appropriate to make a brief listing of the types of computations necessary. This list will contain only one expression of any given type, although several formulas may use the expression with different sets of symbols.

Expression of the form $$c=1\pm\frac{m}{n}\tan\theta \qquad (53)$$

and $$\bar{c}=1\pm\frac{m}{n}\cot\theta \qquad (54)$$

occur in most of the solutions. The recognition that this type of equation could be solved at one step with properly constructed slide rule scales and the formulation of the solutions in terms of this type of expression were two of the most important advances in adapting the solutions to slide rule computation.

Other key advances in the slide rule solution of the photointerpretation problem came when it was discovered that the equations of the form $$c^*=\sqrt{1+\frac{m^2}{n^2}\tan^2\theta} \qquad (55)$$

could be solved at one step on suitably constructed slide rule scales. It was especially fortuitous that a means was discovered to employ the same scales for $m$, $n$, and $\theta$ as were used for computing $c$ and $c$, and that only one additional scale was required for $c^*$.

The computation of the angle $s$ from the formula $$\sec s=\frac{\sec t}{c_o}$$

when $c_o < \sec t$, which arises when one tries to express the length of a horizontal line in terms of the length of its image, may be called the secant dilation, since it replaces the tilt by a larger angle. This computation requires one new scale.

The formula $$\sec u=\frac{c_o}{\sec t} \qquad (12)$$

arises in the problem when $c_o > \sec t$. This can occur only when the midpoint of the image of the horizontal line has a negative $y$, and even then only if either the numerical value of $y$ is large or the tilt angle is large.

Formulas such as $$Q=\frac{AB}{C},\ C=\frac{A\sec\theta}{B},\ C=\frac{A\csc\theta}{B} \qquad (56)$$

and $$C=\frac{A\tan\theta}{B},\ C=\frac{A\cot\theta}{B}, \qquad (57)$$

as well as such formulas as $$B=A\sin\theta, B=A\cos\theta \qquad (58)$$

and $$B=A\sec\theta, B=A\csc\theta, \qquad (59)$$

$$B=A\tan\theta, B=A\cot\theta,$$

must frequently be computed.

The photographic invariant $N$ of equation (10) is of one of the forms in (56). Since $\sin\theta$ and $\cos\theta$ are reciprocals of $\csc\theta$ and sec $\theta$, respectively, the formulas (58) can be regarded as of the same type as the second and third formulas in (56) with the denominator $B$ set equal to 1 and the equations solved for $A$. Similarly, equations of the type (59) are special cases of the type in (56) and (57) with the denominator set equal to 1. Likewise such computations as $$C=AB,\ C=\frac{A}{B} \qquad (60)$$

may be regarded as special cases of equations of the first type in (36) with one of the terms set equal to 1. Thus all such cases will be covered if scales are provided to solve for any one of the unknowns in terms of the others in each of the equations of (56) and (57).

The problem of determining the area involves the computation of an expression of the form $$Q=\frac{AB^2}{C^3}$$

Scales should be provided on which only one step is required to compute $Q$ from arbitrary $A$, $B$, and $C$. Notice that with such scales, simultaneous specialization of two of the four variables to unity in various ways shows that they will provide means for squaring, cubing, extracting square and cube roots, and raising numbers to the 2/3 and 3/2 powers. As a bonus, they will compute reciprocals of squares and cubes.

In computing the distance between two points from the differences of their coordinates, one is required to compute such expressions as $$C=\sqrt{A^2+B^2}\ . \qquad (62)$$

A one-step solution of this equation is possible by two special identical slide rule scales having the values of $A$ placed at $A^2$ units from the register point on the scale. These scales, however, have spacing which varies extremely rapidly. This creates difficulties in securing accuracy over a wide range of values. Besides, two additional scales, one on the slide and one on the body, would be required. Finally, these scales would not cooperate in any useful way with any of the other scales, all of which are logarithmic in nature. One can compromise, however, for a two-step solution if he employs the formulas of type (55) and (60). This may be seen by noting that $$\sqrt{A^2+B^2}=\sqrt{A^2+B^2\tan^2 45^\circ}=A\sqrt{1+\frac{B^2}{A^2}\tan^2 45^\circ}$$

The radical in the last term in first computed, then multiplied by $A$. In practice, greater accuracy is obtained if the larger quantity is taken as $A$.

Most of the application of the slide rule to photointerpretation has been arranged in such a way as to avoid the computation of triple products of the form $$P=ABC \qquad (63)$$

There are, however, occasional formulas, occurring principally in the special cases of extremely high tilt (near 90°) or extremely low tilt (near 0°), that require such a computation. In order to implement the computation of such a product at one setting of the slide, a single additional scale will be required.

In some of the high or low tilt regions where computations are done by special methods to avoid indeterminacies, it may occasionally be advantageous to be able to perform such computations as computing the expression $Q$ from given values of $A$, $B$, and $C$ in the formula $$Q=\frac{A^2B^2}{C^2} \qquad (64)$$

Such computations as these can be performed at one step with a suitable combination of scales. Only one scale in addition to those required for the other computations is needed.

In establishing a slide rule for computations which concern a definite application, not only must the mode of calculation be established, but also the length of the scales to be employed. For this reason, the following discussion leading to the explicit choice of scale functions, employs the specific formulas which are to be used in the application. For example, among the applied formulas which use equations of the form $C=(A \sec\theta)/B$, the one which requires the greatest range is equation (10), namely, $N=(H\sec t)/f$. If the pertinent scales are made long enough to accommodate this computation for all required combinations of the variables, they will then have sufficient range to accommodate all other required computations of the same type.

The photointerpretation equations specifically selected for determining the scale functions are $$N=\frac{H\sec t}{f},\ c=1\pm\frac{y}{f}\tan t$$

$$c^*=\sqrt{1+\frac{y^2}{2}\tan s},\ \sec s=\frac{\sec t}{c_o}\geq 1$$

$$\sec u=\frac{c_o}{\sec t}\geq 1,\ A=\frac{N^2a^*}{c_g{}^3}$$

In addition to these photointerpretive equations, there will be adjoined to three general purpose equations, the first one of equations (56), (63) and (64) which are $$Q=\frac{AB}{C},\ P=ABC,\ Q=\frac{A^2B^2}{C^2}$$

A slide rule which will perform all nine of these computations throughout the required ranges will perform the remaining operations throughout their required ranges. In only one instance will a shift of decimal point be needed; viz, when the distance $D$ is to be computed from equation (30) by the method described above, a simultaneous shift of the decimal points in the coordinates $X$ and $Y$ where they occur under the radical may be required. Because some of the photointerpretation variables and layout variable $D$ have names coinciding with already established names of slide rule scales, particular care must be used in the following sections to distinguish which meaning the symbol has. The symbols which will denote the names of scales and also have other meanings are $A$, $B$, $C$, $D$, and $Q$. For example, the letter $A$ will denote variously, the ground area of a region, a term of a product or quotient, or the name of a scale. The scale must be given a different name from the usual one, the photointerpretation symbol must be changed from the usual one, or the letter is allowed to have different meanings in different contexts. The last alternative appears as being the least confusing. Similar circumstances arise with the other cited variables.

The computation $$N=\frac{H\sec t}{f} \qquad (10)$$

is one which is performed for each of the three problems. This equation may be rewritten as $$\log\sec t-\log N+\log H-\text{from } f=0 \qquad (65)$$

For $0°\leq t\leq 85°$, the value of sec $t$ is between 1 and 12. For $f\geq 0.5$ and $H\leq 100{,}000$, the largest possible value of $N$ is 2,400,000. For the same range of $t$, with $f\leq 1000$ inches and $H\geq 50$ feet the smallest possible $N$ is 0.05. This small $N$ is not likely to be realized; in fact, for photointerpretation purposes it is most unlikely that any combination of $H$ and $f$ will be used for which $N\leq 1$.

This suggests that the functions $H$ and $N$ be placed on the same scale. This scale will be called the $E$ scale and will have a range from 1 to 10,000,000.

The scale for $f$, which will be called the $D$ scale, should be adjacent to that for $N$ and the range should be not less than from 0.5 to 1000. On the rule as finally designed, this scale has the range 0.0001 to 1000, since other quantities requiring smaller values are also to be set and read on it. The left end of the $D$ scale is taken as the register line from which all layout is made on the slide. Thus the layout distance is zero when $f=0.0001$ and the layout function is $$D=4+\log_{10}f.$$

To make each cycle of the scale long enough to get the required reading and setting capability with a sufficient number of intermediate graduations in each cycle, the layout unit is chosen to be 2.5 inches. (For a layout unit of 1 inch the scale function would be $10 + 2.5 \log_{10} f$). The choice of 2.5 inches for the layout unit on the $D$ scale sets the stage for using the layout unit 2.5 inches on all of the scales of the slide rule. This convention is adopted throughout and whenever inches are desired, a multiplication by 2.5 is necessary.

Since it is desirable to establish the scale for $N$ in such a way that $N = 1$ falls at the register line at the left end of the rule, the layout function is $$D = \log_{10} N$$

The layout function for the secant scale will then be $$D = 4 + \log_{10} \sec t.$$

The choice of these functions is equivalent to rearranging the logarithmic equation (65) into the equivalent equation $$(4 + \log \sec t) - \log N + \log H - (4 + \log f) = 0$$

Figure 6:
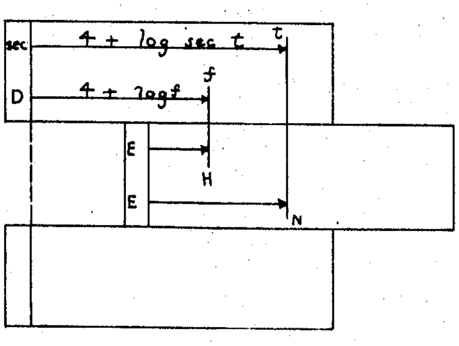
FIG. 6 illustrates the arrangement of scales for computing a first function.

FIG. 6 shows a diagram of the arrangement. A second basic computation is $$c = 1 - \frac{y}{f} \tan t.$$

For points below the horizon $c$ is positive. To separate the variables in this equation, one has to distinguish two cases, $y \tan t > 0$ and $y \tan t < 0$. In the former case a difference of absolute values occurs and in this case we shall denote the computed quantity by the symbol $c^1$ and rewrite (6) as $$1 - c^- = \frac{y}{f} \tan t.$$

This may be rewritten as $$\log(1 - c^1) = \log|y| + \log|\tan t| - \log f$$

or $$(4 + \log|\tan t|) - (4 + \log f) + (4 + \log|y|) - [4 + \log(1 - c^1)] = 0.$$

Figure 7:
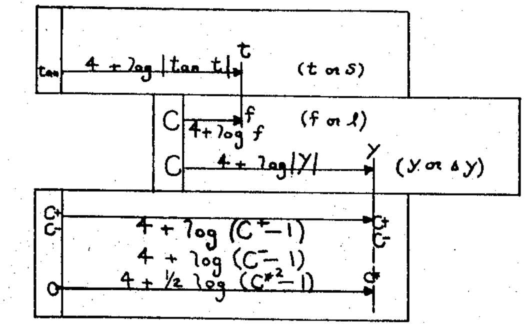
FIG. 7 is an illustration of the arrangement of scales for computing another function.

The inclusion of the 4 in each layout function is for the purpose of placing the range of each variable in the appropriate position on the rule. The arrangement is shown in FIG. 7.

The scale names used are tangent scale, $C$ scale, $C$ scale and $c^1$ scale for the respective variables $t, f, y$, and $c^1$.

When $y \tan t < 0$, the quantity on the right of equation (6) involves the sum of two positive numbers. Denote the quantity to be computed by $c^+$, then $$c^+ - 1 = -\frac{y \tan t}{f} = \frac{|y| \cdot |\tan t|}{f}$$

from which we may obtain $$(4 + \log|\tan t|) - (4 + \log f) + (4 + \log|y|) - [4 + \log(c^+ - 1)] = 0.$$

This yields the same arrangement as for $c^1$ except that the scale function $D = 4 + \log(1 - c^-)$ is replaced by $$D = 4 + \log(c^+ - 1).$$

A second numbering of the $c^1$ scale enables both $c^+$ and $c^1$ to be read from it.

To compute $$\bar{c} = 1 + \frac{y}{f}$$

cot $t$, one needs merely double number the tangent scale so it also serves as a cotangent scale and use the the $c^+$ scale or $c^1$ scale according as $y \cot t < 0$ or $y \cot t > 0$. Similarly, for $$\bar{c} = 1 - \frac{y}{f} \cot t.$$

Another important quantity to be computed is $$c^* = \sqrt{1 + \frac{\Delta y^2}{l^2} \tan^2 s}. \quad (11)$$

To separate variables, this equation may be rewritten as $$\frac{1}{2} \log(c^{*2} - 1) = \log \Delta y - \log l + \log \tan s$$

or $$(4 + \log \tan s) - (4 + \log) + (4 + \log y) - \left[4 + \frac{1}{2} \log(c^{*2} - 1)\right] = 0.$$

This last rearrangement shows that $s$, $l$ and $\Delta y$, can be used on the respective scales of $t, f$, and $y$ of the previous computation, provided only an additional $c^*$ scale with scale function $$D = 4 + \frac{1}{2} \log(c^{*2} - 1)$$

is substituted for the $c^+$ and $c^1$ scale. The $c^*$ scale may be laid parallel to the $c^+$, $c^1$ scale and a cursor with a hairline used to span from the $y$($f$ or $\Delta y$) scale to the $c^*$ scale. Thus only one additional scale is required for this equation.

When $t$ is between 85° and 95° the computation $$c = 1 - \frac{f}{y} \tan \delta,$$

where $\delta$ is the depression angle, is required. This may be accomplished using the tangent, $C$ and $c^1$ or $c^+$ scales, the $c^1$ scale if $$\frac{\tan}{y} \delta > 0 \text{ or the } c^+ \text{ scale if } \frac{\tan \delta}{y} < 0.$$

In computing the length of a horizontal line the computation $$\sec s = \frac{\sec t}{c_o} \quad (8)$$

is employed when $c_o < \sec t$. This can be done on the same scale as was used to compute $N$, provided a double numbering is made so that the range is properly set. This second numbering should be exactly as on the $C$ and $D$ scales and the scale so numbered is also called a $C$ scale.

The computation $$\sec u = \frac{c_o}{\sec t} \quad (12)$$

replaces the last previously discussed computation when $c_o > \sec t$. Although this could be done on the already established scales, by means of an increased number of manipulations, the addition of a second secant scale, this time on the slide, permits the case to be automatically determined and the appropriate computation performed simultaneously with a minimum of additional manipulation. The design is so made that the computation is started as if $c_o \leq \sec t$, and a setting of the slide is made. The indicator is then used to read $s$. If in reading $s$ the hairline of the indicator falls off the left end of the $\sec_1$ scale, then $c_o > \sec t$ and the hairline of the cursor is moved to a different setting to read the value of $u$ from the $\sec_2$ scale. No resetting of the slide is necessary.

For the determination of areas of horizontal regions on the ground plane, the quantity $N$ is the same as in equation (10). The value of $a^*$ of equation (24) can be computed using the $\sec_1$ and $C$ scales. The value of $c_g$ may be computed using the tangent scale, the $C$ scales and, according as $y_g \tan t$ is positive or negative, the $c^1$ or the $c^+$ scale. The only new requirement for this computation is a set of scales by which $$A = \frac{N^2 a^*}{c_g^3}$$

can be computed at one setting. To arrive at such a set of scales, we take the logarithms of both sides of (35) and divide the resulting equation through by three to obtain, after rearrangement, the following equation $$\log c_g - \frac{2}{3}\log N + \frac{1}{3}\log A - \frac{1}{3}\log a^* = 0.$$

This may be further rearranged to yield the equivalent equation $$(4+\log c_g) - \left(\frac{2}{3}\log N\right) + \left(\frac{1}{3}\log A\right) - \left(4+\frac{1}{3}\log a^*\right) = 0.$$

The addition and subtraction of the numerical constants (whose algebraic sum is zero) is calculated to position the scales in such a way that the desired ranges fall within the 17.5 inches spanned by the longest of the other scales, and at the same time to relate the scale for $c_g$ to the register line in the same way that the $C$ and $D$ scales relate to the register line.

The four layout functions for these special scales are then:

$$a^*: D = 4 + \frac{1}{3}\log a^*$$

$$e_g: D = 4 + \log c_g$$

$$N: D = \frac{2}{3}\log N$$

$$A: D = \frac{1}{3}\log A$$

Figure 8:
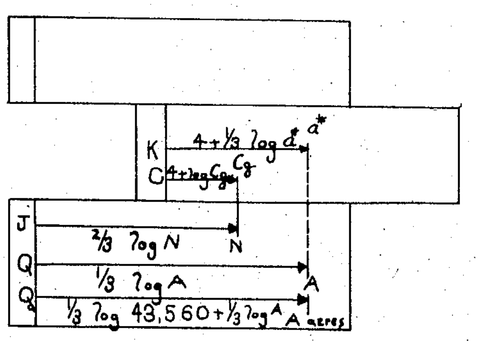
FIG. 8 shows the arrangement of the special scales for computing areas.

FIG. 8 shows the arrangement of these four new scales.

These scales will bear the respective names *K*, *C*, *J*, and *Q*. The *K* scale is so called because it gives the cubes of quantities on the *C* scale. The *J* scale gives the square root of the cube of quantities on the *E* scale. The *Q* scale give cubes of quantities on the *E* scale. The symbol *Q* denotes that it is used for quadrature (determination of area) in the photointerpretation application.

When flying height and ground distances are in meters, the computed value of *A* is in square meters; when flying height and ground distances are in feet, the computed value of *A* is in square feet. In the latter case it may be desirable to have the area in acres. The number of acres equals the number of square feet divided by 43,560. This operation may be accomplished by placing alongside the *Q* scale another scale with the scale function $$D = \frac{1}{3}\log 43{,}560 + \frac{1}{3}\log A_{acres}$$

This scale will be called the $Q_a$ scale. With both scales present the area is computed simultaneously in both square feet and acres.

The $Q_a$ scale does not yield the area in acres if flying height and ground distances are in meters.

The only additional scale required for the one-setting computation of any one of the four quantities *P*, *A*, *B*, or *C* from the other three when $$P = ABC, \qquad (63)$$

is an inverse scale to cooperate with the *C* and *D* scales. This will be a scale running in the opposite direction to that of the *C* scale and having its unit at the same longitudinal position on the slide as that of the *C* scale. To be able to stay within the overall length of the other scales, this should be a seven cycle scale running from 10,000 at its left end to 0.001 at its right end. This will be called the *CI* scale.

The scale function for this inverse scale will then be $D = 4 - \log B$ where *B* is the variable to be used on this scale. The fact that the one step solution of equation (63) is possible with the *D*, *C*, and *CI* scale follows from the fact that the relation $$(4 + \log < ) - (4 - \log \Phi) + (4 + \log \Xi) - (4 + \log \times) = 0$$

Figure 9:
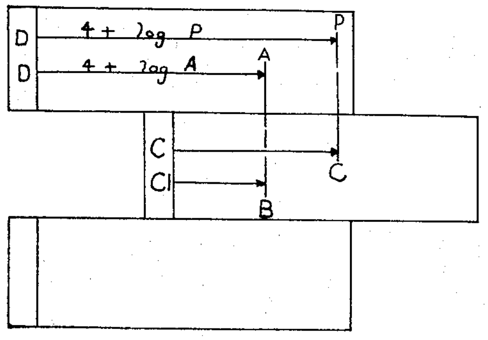
FIG. 9 is an illustration for the scales for continued products.

*is equivalent to*

$$\log < - (-\log B) + \log C - \log P = 0$$

which is the basis for the use of these scales on the ordinary slide rules. The vector diagram is shown in FIG. 9. As will be seen later, space limitations will relegate this scale to the reverse side of the slide. With this arrangement it becomes a bit more convenient to use it in conjunction with the *C* scales which are on that side.

To compute at one step any one of the four quantities *Q*, *A*, *B*, or *C* from the other three when $$Q = \frac{A^2C^2}{B^2}$$

requires a scale with a cycle half as long as that of the *C* scales and with its unit at the same longitudinal position as the unit of the *C* or *D* scale. The slide rule is designed so that most operations of the form *AB*/*C*, *ABC*, (A sec $\theta$)/*B* end up with an answer on the body of the rule. To avoid the transferring of numbers and operator errors, it is therefore desirable to place such an additional scale on the body of the rule. Certain other advantages accrue from doing this. One is that the presence of such a scale permits direct reading of squares, square roots and of sec2$\theta$ and $\tan^2\theta$ without having to bring the slide into play.

The scale function for the one new required scale is $$D = 4 + \frac{1}{2}\log Q$$

In keeping with usual slide rule terminology this will be called the *A* scale. The combination of scale functions which shows that the desired computation can be performed at one step is $$(4+\log A) - (4+\log B) + (4\log C) - \left(4+\frac{1}{2}\log Q\right) = 0$$

which, after some rearrangement becomes $$\log Q = 2\log A - 2\log B + 2\log C.$$

Figure 10:
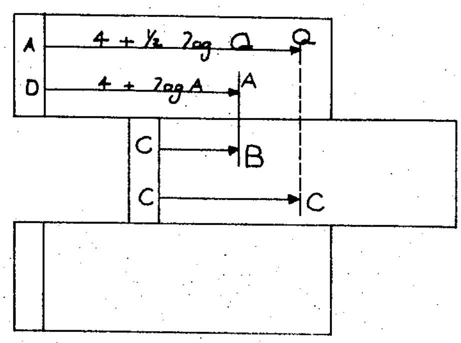
FIG. 10 is an illustration of scales for computing another set of variables.

A diagram of the vector relation is shown in FIG. 10. The variable *A* will be set on the *D* scale, the variables *B* and *C* on the *C* scale, and the variable *Q* on the *A* scale.

Figure 11:
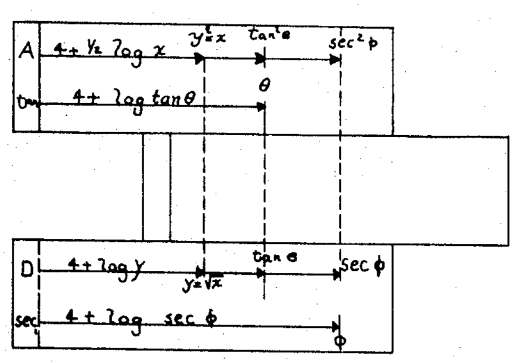
FIG. 11 is an illustration of scale arrangement for direct reading of trigonometric functions squares and square roots.
Figure 12:
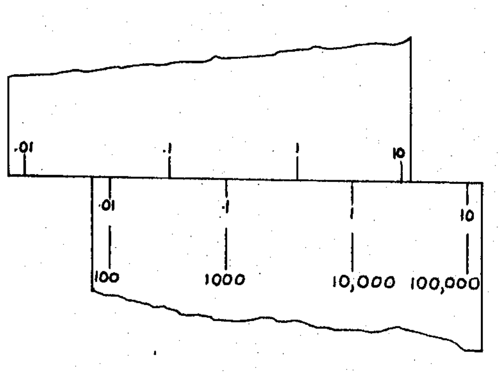
FIG. 12 shows scales for computing another function.

FIG. 11 is a diagram showing the way in which $A^2$, *B*, $\sec^2\theta$, tan2 $\theta$ can be computed without bringing the slide into play.

The relation $$4 + \frac{1}{2}\log x - (4 + \log\tan\theta) = ) = 0$$

is equivalent to $x = \tan^2\theta$; the relation $$4 + \frac{1}{2}\log x - (4 + \log\sec\phi) = 0$$

is equivalent to $x = \sec^2\phi$; the relation $$4 + \frac{1}{2}\log x - (4 + \log y) = 0$$

is equivalent to $x = y^2$ or $y = \sqrt{x}$; the relation $$4 + \log\tan\theta - (4 + \log y) = 0$$

is equivalent to $y = \tan\theta$ *or* $\theta =$ *arc tan* ⅔K *the relation*

$$4 + \log\sec\Phi - (4 + \log y) = 0$$

is equivalent to $y = \sec\Phi$ or $\Phi = \text{arc sec } y$.

To avoid having to turn the rule over and back, a second *D* scale is put above the tangent scale on Side 2 of the Body. In squaring numbers and taking square roots, greater accuracy is obtained and greater ease of operation will be experienced if the *A* and *D* scales are used rather than the *K* and *J* scales. To enable the photointerpreter to dispense with the general purpose slide rule which he would normally require, it is sufficient to put on the Slide, Side 2, a *B* scale identical with the *A* scale.

In order as much as possible to avoid turning the slide rule over for any one operation, the scales have been grouped on the two sides in much the way as shown in FIGS. 6, 7, and 8, with the scales of FIGS. 6 and 8 on Side 1 and the scales of FIG. 7 on Side 2. The two additional scales, the *CI* and *A* scales would preferentially be on Side 1, the *A* scale on the body and the *CI* scale on the slide. However, due to limitations of space on Side 1, these scales are put on Side 2. A showing of the complete layout is shown in FIGS. 13, 13*a*, 13*b*, and 13*c*. The specifications for the final design call for the *J*, *Q*, and $Q_a$ scales to be shifted to the left from their position in this FIG; the three are moved as a group until the one on the *J* and *Q* scales is at the register line.

The Slide Rule is shown in FIG. 13, 13*a*, 13*b*, and 13*c*. It consists of a body 1 (or stock) constructed of two longitudinal rectangular pieces held by end brackets not shown in such a way as to leave between them a space in which the slide may move longitudinally to assume various positions with respect to the body. An indicator (sometimes called a cursor or runner) encircles the body and slide in such a way as to bear firmly on the body and yet be free to move longitudinally thereon. The flat exposed lateral surfaces 7 of the body and the slide bear longitudinal scales graduated according to various mathematical functions. These scales are intersected at right angles by the hairlines of the indicator.

As shown in FIGS. 13, the Body, Side 1, bears on its upper portion a secant scale 9, called the $\sec_1$ scale, bearing graduate marks 50 graduated according to logarithms of the secant function, with angles from 0.5° to 89.5°, and a numerical scale 10 called the *D* scale, bearing graduate marks 49 graduated from 0.0001 to 1,000, according to logarithms of numbers. The secant scale bears a second set of numbers 11, ranging from 89.5° to 0.5°, which are the complementary angles to those of the secant scale. This second set of numbers allows the same set of graduations 50 to serve as marks for a cosecant scale, called the $\csc_1$ scale, graduated according to the logarithms of the cosecant function.

The Body, Side 1, bears on its lower part three scales, a numerical scale 12, called the *J* scale, bearing graduate marks 58 graduated according to two-thirds the logarithms of numbers from 1 to 10,000,000, a second numerical scale 13, called the *Q* scale, bearing graduations 59 graduated according to one-third the logarithms of numbers from 1 to $10^{14}$, and a third numerical scale 14, called the *Qa* scale, bearing graduate marks 60 graduated also according to one-third the logarithms of numbers from 0.0001 to $10^{10}$, but with its unit position shifted longitudinally along the Body with respect to the *Q* scale.

In FIG. 13*a*, the Slide, Side 1, has on its surface four sets of graduate marks 51, 52, 61 and 62. The first of these sets is a logarithmically graduated numerical scale numbered with one set of numbers 15, ranging from 0.0001 to 1,000, and another set of numbers 16 ranging from 1 to 10,000,000. The graduations together with the numbers 15 constitute the *E* scale and the graduations with the numbers 16 constitute a scale which is called a *C* scale. The *E* scale may be regarded as an extension of the *C* scale and is to be used for certain large quantities when the use of the *C* scale would ordinarily be indicated. The second set of graduate marks 52 bears two sets of numbers 17 and 18. The graduations with the set of numbers 17 represent angles from 0.5° to 89.5° and constitutes a secant scale identical with the scale 9 while the graduations and the second (upper) set of numbers ranging from 89.5° to 0.5° constitute a cosecant scale 18 identical with 11. The scale 17 is called the $\sec_2$ scale and the scale 18 is called the $\csc_2$ scale. The third set of graduate marks 61 is appended with numbers 19 numbered from 0.001 to 1,000 and graduated according to one-third the logarithms of numbers. The scale so constituted is called the *K* scale. The fourth set of graduations 62 is appended with numbers 20 numbered from 0.0001 to 1,000 and graduated according to the logarithms of numbers. So numbered, this scale is a duplicate of 16 and is, therefore, also called a *C* scale.

In FIG. 13*b*, the Body, Side 2, bears on its top part three sets of graduations 47, 48 and 53. The first of these is a scale 47 graduated according to one-half the logarithms of numbers 21 having a range from 0.000,000,01 to 1,000,000. The second is a scale 48 graduated like the *C* scales with the logarithms of numbers 22. This scale, whose range, like the *C* scales' range, is from 0.0001 to 1,000, is called the *D* scale in accordance with established terminology. The third set of graduations is double numbered with a set 23 of angles from 0.5° to 89.5°, representing the logarithms of the tangent function and a second set 24 of angles from 89.5° to 0.5° representing the logarithms of the cotangent function. The scale 23 is called the tangent scale and the scale 24 the cotangent scale.

The Body, Side 2, bears on its bottom part two sets of graduate marks 54 and 55. The first of these is double numbered with one set of numbers 25, which is called the $c^+$ scale, and a second set of numbers 26 which is called the $c^1$ scale. The range of the *C* scale is from 1.001 to 100 and the range of the $c^1$ scale is from 0.999 to 0. The $c^+$ scale 25 (read *c* plus scale) is graduated according to the logarithm of the function $c^+ -1$ and bears graduations which are all at least unity. Specifically, the number on the $c^+$ scale at any point is obtainable by adding 1 to the number on the *D* scale 22 at the corresponding longitudinal position on the slide rule. The $c^1$ scale 26 (read *c* minus scale) is graduated according to the logarithm of the function $1 - c^1$ and bears graduations which are all less than unity. In particular, the number on the $c^1$ scale at any point is obtainable by subtracting from 1 the value at the corresponding point of the *D* scale. The remaining scale 55 on the bottom part of the Side 2 of the Body is called the $c^=$ scale (read *c* star scale) and bearing numbers 27 graduated from 1.001 to 100 according to one-half the logarithm of the function $(c^=)2-1$.

In FIG. 13*c*, the Slide, Side 2, contains four graduated scales, two *c* scales 56 and 57 bearing numbers 28 and 29, respectively, a *CI* scale 30 which is essentially a *C* scale reversed, but covering the range 10,000 to 0.001, of numbers 30 and a *B* scale 45, which duplicates on the Slide the *A* scale 21 which is on the Body and bears numbers 31 identical thereto. The scale 57 bearing graduations 29 is called *X* scale in shifted scale embodiment.

To determine an angle from its cosine or secant is normally not considered good computing practice. This is done in formulas (8) and (12), where *s* or *u* is determined from its secant. These auxiliary angles are used solely for the determination of $c_y^=$ and $c_x^=$. A mockup was used to verify the conclusion that the values of *s* and *u* determined from this scale yield adequately accurate determination of $c_y^=$ and $c_x{}^=$ for the photointerpretation problems.

The conclusion reached by operating with the mockup is supported by the following error analysis.

In the formulas $$c_y{*}=\sqrt{1+\frac{\Delta y^2}{l^2}\tan^2 s} \qquad (11)$$

and $$c_x{*}=\sqrt{1+\frac{\Delta x^2}{l^2}\tan^2 u} \qquad (14)$$

which are used for the determination of $c_y^=$ and $c_x^=$, the ratios $|\Delta y|/l$ and $|\Delta x|/l$ are both less than 1, being the reciprocal of the ratio of the length of a line segment to its projection on one of the axes. Since $\Delta x$, $l$, and $u$ enter into $c_y^=$ in the same way as $\Delta y$, $l$, and $s$ enter into $c_y^=$, one analysis will serve for both.

Let $\delta c_y^=$ be the portion of the error in $c^=$ contributed by the ill-determination of *s*. Then from (11)

$$\Delta c_y{*}=\frac{\partial c_y{*}}{\partial s}ds=\frac{\tan s\sec^2 s}{\sqrt{1+\frac{\Delta y^2}{l^2}\tan^2 s}}\ \frac{\Delta y^2}{l^2}ds$$

where *ds* is in radian measure.

The radical in the denominator is greater than or equal to 1 and, as remarked above, $/\Delta y/\ /l$ is less than or equal to 1 so that one gets the inequality $$|\delta c_y{*}|\leq|\tan s|\cdot(\sec^2 s)\cdot|ds|\cdot$$

The error in reading *s* is approximately inversely proportional to the change of the layout function per degree of *s*. The differential of the layout function is $$dD=d(4+\log_{10}\sec s)=\frac{1}{\log_0 10}d(\log_0 \sec s)$$

or $$dD=\frac{\tan s\, ds}{2.303}$$

where $D$ and $dD$ are in layout units of 2.5 inches. This gives the change in the layout function for a change of $ds$ radians in $s$. This may be related to the reading error as follows. If graduate marks are made no closer together than 0.030 inch, the operator will make no mistake larger than about one-fifth of the corresponding interval. Since $D$ is in layout units of 2.5 inches each, 0.030 inch corresponds to 0.012 of a layout unit, and one-fifth of that corresponds to 0.0024 layout unit. Thus the error in reading the position of the indicator may be presumed at its very worst not to exceed 0.0024 layout unit. Thus, $$0.0024 \geq 1/2.304 \tan s \, ds$$

or $$ds \leq 0.00553 \cot s, \qquad (66)$$

which shows just how bad the determination of a $s$ from the secant (or cosine) may become in the neighborhood of 0°. When the error is expressed in degrees it is about 57.3 times the error in radians so that the error in degrees is less than or equal to 0.317 cot $s$. At 10°, the first graduation beyond 0°, this is nearly 2°. At 0° the formula yields an infinite upper bound, but the error will be less than 10°, which is marked by a graduation.

When (66) is combined with (65), the inequality $$dc_y^- \leq 0.0056 \sec^2 s$$

results. Since it is only between 0° and 30° that the ill-determination of $s$ is a matter of concern, the largest value of $\sec^2 s$ under consideration is 4/3. Thus, in the range under consideration, $$dc_y^- \leq 0.0076.$$

Since $c_y^-$ is always at least 1, this shows the ill-determination of $s$ changes $c_y^-$ by no more than 0.8 percent. Similarly, the ill-determination of $u$ induces no more than an 0.8 percent change in $c_x^-$.

The import of this result is that even though the error in reading $s$ may be quite large, it does not contribute significantly more to the total error than measurement errors and the other setting and reading errors.

In any lengthy computation, regardless of the care with which the formulas are chosen, if there are sets of variables which differ widely in the magnitudes, the person doing the computation may organize the operations badly unless given very specific instructions. This is particularly true of a slide rule on which the decimal point is to be automatically set. A scaling study of each formula must be made and in many instances a detailed organization of the order of computation made. To keep the length of the slide rule to a minimum, it is necessary to organize the computations so that all quantities numerically large will be set on or read from scales designed to accommodate these values. Thus, object space dimensions and ground coordinates when given in feet or meters should normally be set on or read from scales which will accommodate large values such as the flying heights, ground distances between objects, lengths of runways, etc. On the other hand, quantities which represent the dimensions from the picture, such as image size, coordinates of image, etc., are small, and should be set on scales designed to accommodate small values.

A person might avoid large values for the object space if kilofeet (1 unit = 1000 feet) or kilometers are used, reducing the data and the end product to values in the same range, but there are other intermediate quantities which must be computed. A great amount of freedom may be exercised in choosing just what the intermediate computations are to be. Thus if the product $$F = abcd$$

is to be computed by paper and pencil methods, the person doing the computing has the choice of any one of 15 essentially different correct ways of arranging the multiplication of four numbers $a$, $b$, $c$, and $d$; viz, $a\cdot(b\cdot(cd))$ $a\cdot(c\cdot(bd))$ $a\cdot(d\cdot(bc))$ $b\cdot(a\cdot(cd))$ $b\cdot(c\cdot(ad))$
$b\cdot(d\cdot(ac))$ $c\cdot(a\cdot(bd))$ $c\cdot(b\cdot(ad))$ $c\cdot(d\cdot(ab))$ $d\cdot(a\cdot(\pi\xi))$
$\gamma\cdot(\pi\cdot(\alpha\xi))$ $\gamma\cdot(\imath(ab))$ $(ab)\cdot(cd)$ $(ac)\cdot(bd)$ $(ad)\cdot(bc)$ The number of ways increases appallingly as the number of factory increases. For theoretical work there is no preference of one over the other since the actual computation is not to be carried out, but only symbolized by $abcd$. For practical computations on a slide rule it makes a great deal of difference, especially if the operator is to be relieved of the necessity of setting the decimal point after each step. Suppose $a$ and $b$ are very large and $c$ and $d$ are very small, say $a$ = 16,300, $b$ = 18,460, $c$ = 0.0123, $d$ = 0.372. The slide rule multiplication of $c$ by $d$ leads to a product 0.00458 and the multiplication of $a$ by $b$ results in a product 301,000,000 (to three significant figure accuracy). The product of all four numbers is then 1,380,000, which falls between the largest previous product and the smallest previous product. To accommodate all the setting and products on a single scale having only complete cycles beginning and ending with powers of 10 would require a range from $1.00 \times 10^{13}$ to $1.00 \times 10^{9}$, or a range of 12 logarithmic cycles. If, however, the slide rule multiplication is done in a different order, say $ac$ times $bd$, the products $ac$ and $bd$ are 200, and 687, so that $abcd$ is computed as the product of two moderate sized numbers. To accommodate all operations by this procedure, the scale need merely cover values from $1.00 \times 10^{12}$ to $1.00 \times 10^{7}$ which can be done with nine logarithmic cycles. By proper choice of the computing technique, the number of cycles was cut by one-fourth from the previous number.

When more than four factors are involved in multiplication or in combined multiplication and division, the ordering becomes much more critical. The formulas for the solution of the photointerpretation problems as formulated for slide rule calculation involve as many as six factors which can cause considerable difficulty in a fixed decimal point operation unless the order of operation is carefully chosen. This will be illustrated in what follows below.

One principle which contributes much to the ability to establish reasonably short scales for the photointerpretation problems, even through some of the variables have quite long ranges, is the "proportionality principle." This principle states that whenever $$a/b = c/d = e/f = \ldots,$$

then any two identical logarithmic scales can be moved into such a relation with each other that $a,c,e,\ldots$ of the one scale are all simultaneously against the respective numbers $b,d,f,\ldots$ on the other.

This principle was used to group the terms of the basic formulas into subcomputations in such a way that quantities of a given magnitude always fall onto a scale designed to accommodate them.

We illustrate the cited application of this principle by a numerical example. The computation of $$L = \frac{(16{,}000)\quad(1.04)\quad(0.214)\quad(18{,}460)}{(0.721)\quad(21{,}300)\quad(3.04)}$$

might be broken down into three steps as follows:

The first step solves for the number $Q_1$ by means of $$Q_1 = \frac{(1.04)\quad(0.214)}{0.721} \text{ or } \frac{Q_1}{1.04} = \frac{0.214}{0.721}$$

The proportion shows that $Q_1$ is small (about 0.3). The second step solves for a number $Q_2$ by means of $$Q_2 = \frac{18{,}460}{21{,}300} Q_1 \text{ or } \frac{Q_2}{18{,}460} = \frac{Q_1}{21{,}300}$$

The proportion shows $Q_2$ to be also small (less than $Q_1$). The third step solves for the number $L$ from $$L = \frac{16{,}000}{3.04} Q_2 \text{ or } \frac{Q_2}{L} = \frac{3.04}{16{,}000}$$

This proportion shows that $L$ is large (larger than 1,000). Thus, for the last two computations the numbers 18,460; 21,300; 16,000; and $L$ should be set or read on one scale whereas 3.04; 2.14; 0.721; 1.04; $Q_1$ and $Q_2$ are to be put on other scales which have quite a different range of values. It is evident then that this particular numerical calculation could be done with a combination of three scales, each having about three cycle range.

If this type of grouping is not done, combinations such as $$\frac{(16,000)\quad(18,460)}{0.721} \text{ and } \frac{0.214}{(21,300)\quad(3.04)}$$

may occur, which for our numerical example, would demand a scale with a range extending at least from $3.31 \times 10^{16}$ up to $3.00 \times 10^{8}$ if decimal points are to be automatically set. If only complete logarithmic cycles are to be used, this means 16 cycles or more would be needed to be sure of never running off the end of the rule. Obviously, a rule of 16 cycles with cycles long enough to give two to three figure accuracy would be too long to be manageable. In our numerical example, the 2.5 inch cycle which we use on the Slide Rule, shown in FIGS. 13, 13*a*, 13*b*, and 13*c*, would require a 40 inch scale length for a badly grouped computation.

Greater difficulty is experienced in finding the correct groupings when the terms are functions such as sec $t$, tan $t$, csc $t$, cot $t$ and functions such as $c$, $\overline{c}$, and $c^=$ whose sizes depend on the geometry of the relation between the photograph and the object space as well as the particular location of the object in the object space and its images' location in the photograph, especial attention has to be paid to those trigonometric functions which approach zero simultaneously or become infinite simultaneously as the angle varies. For example, as $t$ approaches zero both csc $t$ and cot $t$ become infinite in such a way that their ratio approaches 1. Also, as $t$ approaches zero the variable $\overline{c} = 1 + (y \cot t)/f$ becomes infinite in such a way that the ratio of $\overline{c}$ to either cot $t$ or csc $t$ approaches $y/f$. With these and similar considerations, the computing formulas have been formulated so that there will be relatively few cases where the results go off the end of the rule during the course of the computation. If the final product or quotient goes off the left end of the rule, then the answer is effectively zero, a situation which will not normally occur except in the problem of determining object space coordinates of a point. If the final product goes off the right end of the rule, this should mean that the object is so close to the horizon that the error in measurement overshadows the measurements themselves, and the determination is unreliable by any method. If the reading point for $c^1$, $c^+$ or $c^=$ is off the left end of the corresponding scale, then the desired value is effectively 1.00. If the reading point goes off the right end of the $c^+$ or the $c^=$ scale, then the desired value, which is $\geq 100$, may be read from the $D$ scale. The value 0 for $c^1$ in the relation $c^1 = 1 - (y \tan t)/f$ occurs when the point $(x, y)$ is on the horizon. For points above the horizon $c^1$ is negative, a case which will rarely if ever occur in the application. If such a case should occur, one may find $c^1$ from the value of $c^+$, since $c^1 = 2 - c^+$. For $-c^1 \geq 100$, one may read $c^1 = -c^+$ from the $D$ scale with slide rule accuracy. If for any of the variables, the reading point is beyond the end of the $D$ scale, the quantity has a numerical value $> 1000$. This will normally not happen if the special methods are used for tilts near 0° or 90°. If the object is too close to the horizon the value of $c^1$ will be so close to zero that insufficient significant figures are obtainable from the $c^1$ scale. In this case, the special methods described above should be used.

Since a great many of the computations may be for situations in which either the $y$ is considerably less than the focal length or the tangent of the tilt is nearly 0, the range of these special scales will frequently include values down to 1.001 on the $c^+$ scale and up to 0.999 on the $c^1$ scale. For computation of values in the range for $c^+$ between 1.01 and 1.001 and for $c^1$ in the range of 0.990 to 0.999 it is possible to use the $D$ scale, but with some mental calculation on the side. This requires shifting the slide to the right by an integral number of cycles, resetting the value of $y$ against the shifted $C$ scale, reading the value from the $D$ scale and moving the decimal point to the left by as many positions as the number of cycles which the $C$ scale was shifted. The value of $c^+$ is then 1 plus this adjusted $D$ scale reading and the value of $c^1$ is 1 minus this adjusted $D$ scale reading. In order to avoid frequent manipulation of this sort, a four-cycle rule was made with the $c^1$, $c^+$, and $c^=$ scales shifted to the right by one cycle. This necessitated shifting the lower $C$ scale on side 2 one cycle to the right relative to the upper $C$ scale. Such a shift in which the $c^1$, $c^+$, and $c^=$ and lower $C$ ($X$ scale in FIG. 13) scales are moved as a group, does not affect the computation excepting to place the reading point in a more favorable position. This allows the rule to be shortened without danger of running off the end of the scales. The amount of shift is related to range and for the desired range it should be probably in the order of one or two cycles of the $C$ scale. Only experience can show what the most appropriate shift will be in order that the computations required for the specific work have a lower probability of giving readings off one or the other end of the scale. It is clear, however, for low tilt photography, a design which leaves out the range from 0.990 to 0.000 of the $c^1$ scale (and 1.010 to 1.001 on the $c^+$ scale) is undesirable. Since the shifted $C$ scale can no longer operate in the other computations as previously set forth, this scale should be given another designation. The shift of these scales in the preferred embodiment is shown in FIGS. 13, 13*a*, 13*b*, and 13*c*.

There is for the four-cycle slide rule one additional change which must be made in the equations. The equations given for the $J$, $Q$, and $Qa$ scales are such as to move the left ends of the $J$ and $Q$ scales over to the register line which passes through 0.0001 on the $D$ scale. When the two leftmost $E$ scale cycles are cut off, these must be moved back to the right. Otherwise, areas less than $10^6$ sq. ft. (about 23 acres) will be cut off the scale. The $J$, $Q$, and $Qa$ scales can be moved as a unit longitudinally without affecting any of the computations as long as they maintain their relative relations. Fortunately, the most appropriate shift just adds two layout units to the layout functions. This shifts the position of the $J$ scale by a whole number of cycles of the $J$ scale and shifts the positions of the $Q$ and $Qa$ scales by a whole number of their cycles.

The use of kilofeet (or kilometers) instead of feet (or meters) for the flying height is desirable in aerial photography. This permits the elimination of the $E$ scale number 16 from the $E$ and $C$ scale 51. The $E$ numbers removed from this scale would not affect the computations insofar as it applies to the calculation of $N$ for use in all problems except that of horizontal area. Even then, it remains true apart from the fact that the value of $N$ secured from the $C$ scale would be 0.001 times the number to be set on the $J$ scale in computing the area, all other quantities being the same. It is possible to compensate for this factor by merely renumbering the $J$ scale using numbers 1/1000 times their numbering as shown in FIGS. 13 and 13*a*, which apply to the seven cycle rule with an $E$ scale. That is to make settings of kilofeet directly on the $J$ scale, the numbers should be changed so that each is the present number divided by 1000. In the preferred embodiment, the range will be from 0.001 to 10,000 with the graduations unchanged in printing, merely labeled differently. That is, 1/1000 = 0.001, number 10 becomes 10/1000 = 0.01, number 100 becomes 0.1, etc., to the number 10,000,000 which becomes 10,000. This makes all the necessary compensations to allow reading of square feet on the $Q$ scale and acres on the $Qa$ scale.

In those instances where the actual heights or lengths of objects which have a photographic dimension less than 0.01 inch are to be determined, the $C$ scale may be extended to the left of 0.01. For a 10 inch rule having essentially four $C$ scale cycles, it is preferred to take the $C$ and $D$ scales at least down to 0.005 unit, rather than to 0.01, especially in the case where the measurements are to be made in inches on the photograph. This would mean that the smallest measurement ($\Delta x$, $\Delta y$, or $l$) that could be used would be 0.005 inch without manipulating decimal points. This extends the $C$ scale to the left by about 0.301030 times the layout unit beyond $C=100$.

For easy reading, the tangent scale should go from 0.5° to 89.5°. This extends to the left of 0.01 on the *D* scale, but not to the left of 0.005. It also extends it to the right beyond 100 on the *D* scale by 0.059142 times the layout unit.

For maximum accuracy, the $c^+$ scale should be extended to the left at least to 1.005 and the $c^1$ correspondingly to 0.995. This gives the same left end point as the *C* and *D* scales. No extension to the right beyond $c^+=100$ is necessary.

The *A* and *B* scales may be shortened to the range 0.0001 to 10,000.

For easy reading, the secant scale should go to 89.5 ° which extends the secant scale by 0.059158 times the layout unit beyond the 100 point on the *C* or *D* scale.

If the *C* and *D* scales are extended to the left to 0.005, then it would also be advantageous to extend the *CI* scale to the left to 200 (instead of 100) which is 0.301030 layout unit to the left beyond 0.01 on the *C* scale (that is, at 0.005 on the *C* scale).

It will become apparent from the formulas described below that all the formulas can be written as proportions. That is, the formulas can be arranged so that the relative position of the variables in them suggests the position of the variables on the slide rule. This will serve as a mnemonic or memory aid. For example, for computation of the form $$d=\frac{ab}{c}$$

which uses two adjacent scales, one from the slide and one from the body, the formula may be so arranged that it appears as a proportion $$\frac{d}{b}=\frac{a}{c} \text{ or } \frac{a}{c}=\frac{d}{b}$$

In a specific embodiment such as for computing horizontal distance, the formulas are arranged as follows:

Formulas:

Step 1: $\frac{f}{H}=\frac{\sec t}{N}$  Step 2: $\frac{\tan t}{f}=\frac{1-c_o}{y_o}$ Usual case:

Step 3: $\frac{\sec t}{c_o}=\frac{\sec s}{1}$  Step 4: $\frac{\tan s}{l}=\frac{\sqrt{(c_y*)^2-1}}{\Delta y}$ Step 5: $\frac{l}{c_o}=\frac{l_y*}{c_y*}$  Step 6: $\frac{1}{N}=\frac{l_y*}{L}$ Unusual case:

Step 3A: $\frac{\sec t}{c_o}=\frac{1}{\sec u}$  Step 4A: $\frac{\tan u}{l}\ \frac{\sqrt{(c_x*)^2-1}}{\Delta_x}$ Step 5A: $\frac{l}{c_o}=\frac{lx*}{c_x*}$  Step 6A: $\frac{\sec u}{N}=\frac{lx*}{L}$ The scales therefore on the slide rule have been arranged, in keeping with the proportionality principle, so that all the numerators appear on scales on the body of the slide rule and all the denominators appear on scale on the slide of the slide rule. The proportionality principle is used to combine the addition and subtraction of the logarithms of three of these functions to mechanically derive the logarithm of a fourth in almost all cases. Because the location of the logarithms of the value of the function is labeled with the value of the variable, the settings and readings are made directly with the values of the variables themselves, obviating the necessity of having tables of logarithms and of the functions.

The operation of the rule of FIGS. 13, 13*a*, 13*b*, and 13*c* may now be given. The unknown *N* is solved by equation (10); *N* is found in every set of equations for various quantities expressed above and for all points. Once *N* is computed for the photograph it applies to all the specified dimensions to be computed from the photograph. The slide is shifted to the left (or to the right) until the focal length (*f*) on the *D* scale 10 of the body side 1 is in register with the flying height (*H*) on the *E* scale 16 of slide side 1. The cursor is then shifted until its hairline is at (*t*) the tilt angle on the $\sec_1$ scale 9 of body side 1. At the point where the hairline of the cursor cuts the *E* scale 16 of slide side 1, the photograph invariant *N* is read. In the succeeding computations the following step by step procedure is followed using the cursor wherever necessary to obtain alignments for settings or readings. For computing for horizontal length:

Step 1. Use Side 1 to compute *N*, as above.

Step 2. Use Side 2. Set *t* (tan scale 23 on body side 2) against *f* (*C* scale 28 on slide side 2) and against $y_o$ (*C* scale 29 slide side 2) read $c_o$ ($c^1$ scale 26 body side 2 if $y>0$ or $c^+$ scale 25 slide side 2 if $y<0$). If $y=o$ or if the hairline of the cursor falls to the left of the left end of the reading take $c_o=1$.

Step 3. Use Side 1. Set *t* ($\sec_1$ scale 9) against $c_o$ (*C* scale 15) and against 1 (C scale 15) read *s* ($\sec_1$ scale 9). If the 1 on the *C* scale 15 falls beyond the left end of the $\sec_1$ scale 9, there is no *s*. In that case go directly to Step 3A and continue that sequence. If *s* can be read, however, go to Step 4.

Step 4. Use Side 2. Set *s* (tan scale 23 body side 2) against (*C* scale 28) and against *y* (*C* scale 29) read $c_y*$ ($c^=$ scale 27 body side 2).

Step 5. Use Side 1. Set (*D* scale 10) against $c_o$ (*C* scale 15) and against $c_y*$ (*C* scale 15) read $y^=$ (*D* scale 10).

Step 6. Use Side 1. Set 1 (*D* scale 10) against *N* (*E* scale 16) and against $y^=$ (*D* scale 10) read *L* (*E* scale 16).

Step 3A. Use Side 1. Set *t* ($\sec_1$ scale 9) against $c_o$ (*C* scale 15) and against 1 (*D* scale 10) read *u* ($\sec_2$ scale 17). (Note that the setting is the same as for Step 3. Only the reading is different.)

Step 4A. Use Side 2. Set *u* (tan scale 23) against (*C* scale 28) and against *x* (*C* scale 29) read $c_x*$ ($c^=$ scale 27).

Step 5A. Use Side 1. Set (*D* scale 10) against $c_o$ (*C* scale 15) and against $cx^=$ (*C* scale 15) read $x^=$ (*D* scale 10).

Step 6A. Use Side 1. Set *u* ($\sec_1$ scale 9) against *N* (E scale 16) and against $x^=$ (*D* scale 10) read *L* (*E* scale 16).

For computing vertical height:

Step 1. Use Side 1 to compute *N* as above.

Step 2. Use Side 2. Set *t* (tan scale 23) against *f* (*c* scale 28) and against $y_b$ (*C* scale 29) read $c_b$ (from $c^1$ scale 26 if $y_b>0$ or from $c_+$ scale 25 if $y_b>0$). If $y_b$=o or if the hairline of the cursor falls to the left of the left end of the reading take $c_b=1$. If $/\Delta y/\geqq/\Delta x/$ go to Step 3; if $/\Delta x/>/\Delta y/$ go to Step 3A.

Step 3. Use Side 2. Set *t* (cot scale 24) against *f* (*C* scale 28) and against $y_t$ (*C* scale 29) read $c_t$ ($c_+$ scale 25 if $y>0$, $c^1$ *scale 26 if* $y<0$). If $y_t=0$, take $c=1$.

Step 4. Use Side 1. Set $\Delta y$ (*D* scale 10) against $c_t$ (*C* scale 15) and against *t* ($\csc_Z$ scale 18) read $\Delta y*$ (*D* scale 10).

Step 5. Use Side 1. Set $c_b$ (*D* scale 10) against *N* (*E* scale 10) and against $y^=$ (*D* scale 10) read *h* (*E* scale 10).

Step 3A. Use Side 1. Set $\Delta x$ (*D* scale 10) against $c_b$ (*C* scale 15) and against *t* ($\sec_Z$ scale 17) read $\Delta x^=$ (*D* scale 10).

Step 4A. Use Side 1. Set $\Delta x^=$ (*D* scale 10) against $x_t$ (*C* scale 15) and against *f* (*C* scale 15) read *p* (*D* scale 10).

Step 5A. Use Side 1. Set 1 (*D* scale 10) against *N* (*E* scale 16) and against *p* (*D* scale 10) read *h* (*E* scale 10).

For computing horizontal area:

Step 1. Use Side 1 to compute *N* as above.

Step 2. Use Side 2. Set *t* (tan scale 23) against *f* (*C* scale 28) and against $y_g$ (*C* scale 29) read $c_g$ ($c^1$ scale 26 if $y>0$, $c_+$ scale 25 if $y<0$). If $y=0$ take $c_g=1$.

Step 3. Use Side 1. Set 1 (*D* scale 10) against a (*C* scale 15) and against *t* ($\sec_1$ scale) read $a^=$ (*C* scale 15).

Step 4. Use Side 1. Set *N* (*J* scale 12) against $c_g$ (Cscale 20) and against $a^=$ (*K* scale 19) read *A* (*Q* scale 13), or $A_{acres}$ ($Q_a$ scale 14) when object space coordinates are in feet.

For computing object space coordinates:

Step 1. Use Side 1 to compute *N* as above.

Step 2. Use Side 2. Set *t* (tan scale 23) against *f* (*C* scale 28) and against *y* (*C* scale 29) read $c_y$ (from $c^1$ scale 26 if $y>0$ or $c_+$ scale 25 if $y<0$). If $y=0$, take $c_y=1.00$.

Step 3. Use Side 2. Set *t* (cot scale 24) against *f* (*C* scale 28)

and against $y$ ($C$ scale 29) read $c_y$ (from $c_+$ scale 25 if $y > 0$ or from $c^1$ scale 26 if $y < 0$). If $y < 0$ and the hairline for reading $c_y$ falls to the right of 0 on the $c^1$ scale 26, take $c_y = Z - c$ where $c^+$ is read from the $c^+$ scale 25 at the hairline. This makes $\overline{c}_y$ negative and $Y$ will also be negative.

Step 4. Use Side 2. Set $t$ (tan scale 23) against 1 ($C$ scale 28) and against $|\overline{c}_y|$ ($C$ scale 28) read $c$ ($D$ scale 22). Give $C$ the same sign as $\overline{c}_y$.

Step 5. Use Side 1. Set $c_y$ ($D$ scale 10) against $N$ ($E$ scale 16) and against $|x|$ ($D$ scale 10) read $X$ ($E$ scale 16). Give $X$ the same sign as $x$.

Step 6. Use Side 1. Set $c_y$ ($D$ scale 10) against $H$ ($E$ scale 16) and against $C$ ($D$ scale 10) read $Y$ ($E$ scale 16). Give $Y$ the same sign as $\overline{c}_y$ and $C$.

Although certain and specific embodiments have been shown, it is to be understood that modifications and improvements may be made to the preferred embodiment within the scope of the invention.

For similar formulas modified to retain accuracy when the tilt angle is near 0° or 90°, for those cases when mathematical singularities occur at 0° or 90° for the above computations, the same set of scales and the above type of procedure are applicable.

It is to be noted in the above procedure that the overall computations are arranged so that in almost every step you enter with three quantities and read a fourth. This minimizes the number of computational steps required to compute the desired dimensions. Further, each step of a computation is performed on a single side of the rule—even though it usually may pertain to four quantities. Moreover, the number of instances that the use of the cursor is required for alignment is minimized by the proper selection of a similar scale adjacent to where the reading is taken.

I claim:

1. A slide rule for computing the dimensions and positions of objects appearing on aerial photographs and having a plurality of numerical scales graduated according to a constant plus a second constant times the logarithm of the numbers associated with the graduations, and a plurality of function scales graduated according to some constant plus a second constant times the logarithm of the function of the numbers associated, said graduations operable to compute horizontal length, height, and object space coordinates, the improved scales and improved arrangement of scales, comprising a body portion, a slide portion movable longitudinally therebetween, and a cursor positioned to be slidable over said body and said slide, said cursor bearing a pair of hairlines one on each side, said hairlines registering with each other; said body on a first side on its upper portion bearing a scale (50) having double appended numbers representing angles, one set of said numbers (9) denoting a secant function, and said second set of said numbers (11) denoting a cosecant function, and a numerical scale (49) appended with a set of numbers (10); said slide on a first side bearing a numerical scale (51) appended with a first and a second set of numbers (15, 16), and a second scale (52) having double appended numbers representing angles, one set of said numbers (17) representing angles denoting a secant function and said second set of numbers (18) representing angles denoting a cosecant function; said body on a second side on its upper portion bearing a scale (53) appended with a first and second set of numbers representing angles, said first set of numbers (23) denoting a tangent function and said second set of numbers (24) denoting a cotangent function; said body on a second side on its lower portion bearing a scale (154) having double appended numbers, one set of said numbers (25) all at least unity and representing a first a function ($c^+$), and said second set of numbers (26) all less than unity and representing a second function ($c^1$), and a second scale (55) appended with a set of numbers (27) representing a third function ($c^=$).

2. A slide rule as set forth in claim 1, wherein said scale (50) with double appended numbers on said body on a first side has graduations laid out with respect to some appropriate and arbitrary layout unit in accordance with distances from a register line, said distances having values of the layout function.

$$4 + \log \sec t$$

for values $t$ of the said first set of appended numbers (9) representing the secant function of the associated angles and appended to the respective graduations, said second set of appended numbers each being 90 minus the corresponding number of the first appended set and representing a cosecant function; said numerical scale (49) having graduations laid out with respect to the same said layout unit in accordance with distances from the same said register line, said distances being given by values of the layout function $$4 + \log x$$

for numbers $x$ of the set of numbers (10) appended to the respective graduations of said scale (49); said numerical scale (51) on said slide on a first side having graduations laid out with respect to the same said layout unit in accordance with distances from a register line on said slide, said distances being given by values of the layout function $$4 + \log x$$

for values $x$ of the respective numbers (15) of the set appended thereto, said second set of numbers (16) appended thereto being respectively $10^4$ times the corresponding numbers of said first set of numbers appended thereto; said second scale (52) on said slide on a first side having double appended numbers (17, 18) and bearing graduations laid out with respect to said layout unit in accordance with distances from said register line on said slide on a first side, said distances being given by values of the layout function $$4 + \log \sec t$$

for values $t$ of the said first set of appended numbers (17) representing angles, said appended numbers (18) of said second set being respectively 90 minus the corresponding numbers of the first set, said second set of numbers representing a cosecant function; said scale (53) on said body on a second side on its upper portion being graduated with respect to the same said layout unit, distances of said graduations being measured from a third register line aligned with said first register line, said distances being computed as values of the layout function $$4 + \log \tan t$$

for numbers $t$ of the first appended set (23) of numbers representing angles and denoting a tangent function, said second set of appended numbers (24) representing angles denoting a cotangent function, wherein each number of the second appended set is 90 minus the corresponding number of the first set; said scale (54) on said body on a second side on its lower portion bearing double appended numbers and having graduations laid out with respect to the same said layout unit according to distances from a fourth register line on said body on a second side on its lower portion, said fourth register line being aligned with other register lines on said body, and said distances given by values of the layout function $$4 + \log (c^+ - 1)$$

for values ($c^+$) of said first set of numbers (25) appended thereto, said second set of appended numbers (26) representing values of ($c^1$), each being 2 minus the corresponding value of the appended number ($c^+$); said second scale (55) on said body on a second side on its lower portion appended with a set of numbers (27) representing values of ($c^=$), said scale being graduated with respect to the same said layout unit according to distances from said fourth register line, said distances being given by the layout function $$4 + \frac{1}{2} \log (c^{*2} - 1),$$

wherein each such said graduation is appended with the corresponding value of ($c^-$); said scales laid out in said physical relation to each other and to said body and slide and register lines thereon being in such physical relation as to enable ready calculation of horizontal length, vertical height, and object space coordinates in a simplified and abbreviated procedure.

3. A slide rule as set forth in claim 2 wherein the scales are physically laid out in correct physical relation to each other and to the body and slide as to enable the computation of horizontal length as expressed by $$L=\frac{H\sec t}{f}\cdot\frac{l}{c_o}\cdot\sqrt{1+\frac{\Delta y^2\tan^2 s}{l^2}}$$

and intermediate quantities $c_o$ and $s$ as expressed by $$c_o=1-\frac{y_o}{f}\tan t$$

and $$s=\text{Arc sec}\left(\frac{\sec t}{c_o}\right),$$

using, in all, six slide rule operations; wherein the scales are physically laid out in correct physical relation to each other and to the body and slide as to enable the computation of vertical height as expressed by $$h=\frac{H\sec t}{f}\cdot\frac{\Delta y\ csc\ t}{1+\frac{y_t\cot t}{f}}\cdot\frac{1}{1-\frac{y_b\tan t}{f}}$$

using, in all, five slide rule operations; wherein the scales are physically laid out in correct physical relation to each other and to the body and slide as to enable the computation of ground coordinates $X$ and $Y$ as expressed by $$X=\frac{H\sec t}{f}\cdot\frac{x}{1-\frac{y\tan t}{f}}$$

and $$Y=H\frac{\sin t\left(1+\frac{y\cot t}{f}\right)}{\cos t\left(1-\frac{y\tan t}{f}\right)}$$

using, in all, six slide rule operations.

4. A slide rule as set forth in claim 2 wherein said slide bears a second numerical scale with graduations laid out with respect to said layout unit in accordance with distances from said register line on said slide, said distances having values of the layout function $$a+4+\log x$$

wherein $a$ is some number of the order of 1 or 2, and wherein the said layout functions for the graduations of the scales of said body on a second side on a lower portion are altered to become $$a+4\log(c^+-1)$$

and $$a+4+½\log(c^{-2}-1),$$

the addition of said constant $a$ to the said three layout functions having the effect of shifting the corresponding said scales to the right by an amount equal to the number of layout units represented by the number $a$, said shift being relative to all other scales on said body and said slide, and wherein the left and right end portions of said body and slide may each be cropped off by an amount in the order of 1½ layout units without materially reducing the range of the values for which the operations are possible on the slide rule.

5. A slide rule as set forth in claim 4 wherein the scales are physically laid out in correct physical relation to each other and to the body and slide as to enable the computation of horizontal length as expressed by $$L=\frac{H\sec t}{f}\cdot\frac{l}{c_o}\cdot\sqrt{1+\frac{\Delta y^2\tan^2 s}{l^2}}$$

and the computation of intermediate quantities $c_o$ and $s$ as expressed by $$c_o=1-\frac{y_o}{f}\tan t$$

and $$s=\text{Arc sec}\left(\frac{\sec t}{c_o}\right)$$

using, in all, six slide rule operations; wherein the scales are physically laid out in correct physical relation to each other and to the body and slide as to enable the computation of vertical height as expressed by $$h=\frac{H\sec t}{f}\cdot\frac{\Delta y\ \csc t}{\bar{c}_t}\cdot\frac{1}{c_b}$$

and the computation of intermediate quantities $\bar{c}_t$ and $c_b$ as expressed by $$\bar{c}_t=1+\frac{y_t}{f}\cot t$$

and $$c_b=1-\frac{y_b}{f}\tan t$$

using, in all, five slide rule operations; wherein said scales are physically laid out in correct physical relation to each other and to the body and slide as to enable the computation of object space coordinates $X$ and $Y$ as expressed by $$X=\frac{H\sec t}{f}\cdot\frac{x}{c_y}$$

and $$Y=\frac{HC}{c_y}$$

and the computation of intermediate quantities $c_y$, $\bar{c}_y$, and $C$ as expressed by $$\bar{c}_y=1+\frac{y\cot t}{f}$$

$$c_y=1-\frac{y\tan t}{f}$$

and $$C=\bar{c}_y\tan t,$$

using, in all, six slide rule operations.

6. A slide rule as set forth in claim 2 and further operable to compute object space area of horizontal regions appearing on aerial photographs, wherein said slide on a first side bears a second numerical scale having graduations laid out with respect to said layout unit in accordance with distances from said register line on said slide on said first side, said distances being given by values of the layout function $$4+⅓\log x,$$

for numbers $x$ appended to said second numerical scale on said slide on said first side; wherein said body on a first side on a lower portion bears a couplet of numerical scales, one of said scales of said couplet having graduations laid out with respect to said layout unit in accordance with distances from an extended register line on said body on a first side on a lower portion, said extended register line being aligned with said first register line on said body on a first side on a top portion, said distances being given by values of the layout function $$\tfrac{2}{3}\log N$$

for numbers $N$ of the set appended to the graduations on said first numerical of said couplet, and a second scale of said couplet having graduations laid out with respect to same said layout unit in accordance with distances from said extended register line, said distances being given by the values of the layout function $$\tfrac{1}{3}\log A$$

for numbers $A$ of the set appended to said graduations of said second numerical scale of said couplet.

7. A slide rule as set forth in claim 6 and operable to compute object space area of horizontal regions appearing on aerial photographs simultaneously in square feet and in acres, wherein said body on a first side on a lower portion bears a third numerical scale in addition to those of said couplet, said third numerical scale having graduations laid out with respect to said layout unit in accordance with distances from said extended register line, said distances having values of the layout function $$\tfrac{1}{3}\log 43{,}560+\tfrac{1}{3}\log A_a$$

for numbers $A_a$ of the set of numbers appended to the respective graduations of said third numerical scale; all of said scales on said body and said slide laid out in said physical relation to each other and to said body and slide and to said register lines thereon being in such physical relation as to enable ready calculation of horizontal length, vertical height, object space coordinates, and object space area of horizontal regions, said area computable simultaneously in square feet and in acres, said calculation being effected in a simplified and abbreviated procedure.

8. A slide rule as set forth in claim 1 wherein said slide bears a second numerical scale (57) appended with a set of numbers (29) graduated according to a first constant plus a seconstant times the logarithms of the numbers appended thereto, said first and second constants being the same, respectively, as the said first and second constants used in graduating the said first numerical scale (51) on said slide, and wherein said scales on said body on a second side on a lower portion and said second numerical scale on said slide are all shifted by an assigned amount, on the order of one or two cycles of the numerical scales, to the right relative to the other scales on said body and said slide.

9. A slide rule as set forth in claim 1 and further operable to compute object space area of horizontal regions appearing on aerial photographs, wherein said slide on a first side bears a second numerical scale having cycles of length equal to one-third of a cycle of said first numerical scale on said slide on a first side, and wherein said body on a first side on a lower portion bears a couplet of numerical scales, a first numerical scale *o* of said couplet having cycles of length equal to two-thirds of a cycle of said first numerical scale on said slide on a first side, a second numerical scale of said couplet having cycles of length equal to one-third the length of a cycle of said first numerical scale on said slide on said first side.

10. A slide rule as set forth in claim 9 and operable to compute object space area of horizontal regions appearing on aerial photographs simultaneously in square feet and acres, wherein said body on a first side on a lower portion bears a third numerical scale in addition to those of said couplet, said third numerical scale having graduations laid out as for said second numerical scale of said couplet and shifted longitudinally to the right with respect to said first and second scales of said couplet by an amount determined so that the particular graduation appended with the number 1 on said third scale is aligned with that point on said second scale of said couplet to which the reading 43,560 corresponds.

11. A slide rule for computing the dimensions and positions of objects appearing on aerial photographs and in a preferred embodiment having a plurality of scales graduated according to a constant plus a second constant times the logarithm of the numbers associated with the graduations, and a plurality of function scales graduated according to some constant plus a second constant times the logarithm of the function of the numbers associated, said graduations operable to compute horizontal length, vertical height, object space coordinates, and area of horizontal regions, the improved scales and improved arrangement of scales, comprising a body portion, a slide portion movable longitudinally therebetween, and a cursor positioned to be slidable over said body and said slide, said cursor bearing a pair of hairlines, one on each side, said hairlines registering with each other; said body on its first side on an upper portion bearing a scale (50) having double appended numbers representing angles, one set of said numbers (9) representing angles from 0° to 89.5° and denoting a secant function, and said second set of said numbers (11) representing angles from 0.5° to 90° and denoting a cosecant function, and a numerical scale (49) appended with a set of numbers (10) having values from 0.005 to 100; said slide on a first side bearing a numerical scale (51) appended with a set of numbers (15) having values from 0.005 to 100, a second scale (52) having double appended numbers representing angles, one set of said numbers (17) having values from 0° to 89.5° and representing angles denoting a secant function and said second set of numbers (18) having values from 0.5° to 90° and representing denoting a cosecant function, a third scale (61) being a numerical scale appended with a set of numbers (19) having values from 0.001 to 1,000, and a fourth scale (62) being a numerical scale, appended with a set of numbers (20) having values from 0.005 to 100; said body on a first side on a lower portion bearing a triplet of numerical scales, a first scale (58) of said triplet appended with a set of numbers (12) having values from 0.001 to 1,000, a second scale (59) of said triplet appended with a set of numbers (13) having values from 1 to $10^{12}$, and a third scale (60) of said triplet appended with a set of numbers (14) having values from 0.0001 to $10^8$; said body on a second side on an upper portion bearing a first numerical scale (47) appended with a set of numbers having values from 0.000025 to 10,000, a second numerical scale (48) appended with a set of numbers having values from 0.005 to 100, a function scale (53) appended with two sets of numbers representing angles, a first of said two sets of appended numbers (23) having values from 0.5° to 89.5° and denoting a tangent function, the said second set of said numbers (24) having values from 89.5° to 0.5° and denoting a cotangent function; said slide on a second side bearing a first numerical scale (56) appended with a set of numbers (28) having values from 0.005 to 100, a second numerical scale (46) appended with a set of numbers (30) having values from 200 to 0.01, a third numerical scale (45) appended with a set of numbers (11) having values from 0.000025 to 10,000, a fourth numerical scale (57) appended with a set of numbers (29) having values from 0.001 to 30; said body on a second side on a lower portion bearing a first function scale (54) appended with a first and a second set of numbers, said first set of appended numbers (25) being all at least unity and having values from 1.001 to 30 and said second set of appended numbers (26) being all less than unity and having values from 0.999 to 0.000, and a second function scale (55) appended with a set of numbers all at least unity and having values from 1.001 to 30; wherein said scales on said body are graduated with respect to a selected layout unit of the order of 1½ to 2½ inches according to distances from a common register line on said body and said scales on said slide are graduated with respect to the same said layout unit according to distances from a common register line on said slide, said distances being given by the respective layout functions $$2.3010+\log\sec t$$

for numbers (9) appended to scale (50), said numbers representing angles $t$ and denoting a secant function, and said scale being appended with a second set of numbers (11) representing complementary angles and denoting a cosecant function, $$2.301+\log x$$

for numbers (10) having values $x$ appended to said numerical scale on said body on a first side on a top portion, $$2.3010+\log x$$

for numbers (15) having values $x$ appended to said first numerical scale (51) on said slide on a first side, $$2.3010+\log \sec t$$

for numbers (17) appended to said scale (52), said numbers representing angles $t$ and denoting a secant function and said scale bearing a second set of appended numbers (18) representing angles complementary to $t$ and denoting a cosecant function, $$2.3010+\tfrac{1}{3}\log a$$

for numbers (19) appended to said second numerical scale (61) on said slide on a first side, $$2.3010+\log x$$

for numbers (20) appended to said third numerical scale (62) on said slide on said first side, $$2.3010+\tfrac{2}{3}\log N$$

for numbers (12) appended to a first numerical scale (58) on said body on said first side on lower portion, $$0.3010+\tfrac{1}{3}\log A$$

for numbers (13) appended to a second numerical scale (59) on said body on said first side on said lower portion, $$0.3010+\tfrac{1}{3}\log 43{,}560+\log A_a$$

for numbers (14) appended to a third numerical scale (60) on said body on said first side on said lower portion, $$2.3010+\tfrac{1}{2}\log x$$

for numbers (21) appended to a first numerical scale (47) on said body on a second side on a top portion, $$2.3010+\log x$$

for numbers (22) appended to a second numerical scale (48) on said body on said second side on said top portion, $$2.3010+\log \tan t$$

for numbers (23) representing angles $t$ and denoting a tangent function, said numbers appended to a function scale (53) on said body on said second side on said top portion, and said function scale (53) being appended with a second set of numbers (24) representing angles complementary to $t$ and denoting a cotangent function, $$2.3010+\log x$$

for numbers (28) appended to a first numerical scale (56) on said slide on a second side, $$2.3010-\log x$$

for numbers (30) appended to a second numerical scale (46) on said slide on said second side, $$2.3010+\tfrac{1}{2}\log x$$

for numbers (31) appended to a third numerical scale on said slide on said second side, $$3.0000+\log x$$

for numbers (29) appended to a fourth numerical scale on said slide on said second side, $$3.0000+\log(c^{+}-1)$$

for a first set of numbers (25) representing a function ($c^{+}$) and appended to a first function scale (54) on said body on said second side on a lower portion, said scale (54) being appended with a second set of numbers (26) representing a function ($c^{-}$), the respective numbers of said second set being equal to 2 minus the corresponding numbers of said first set, $$3.0000+\tfrac{1}{2}\log(c^{*2}-1)$$

for numbers (27) representing a function ($c^{=}$) and appended to a second function scale (55) on said body on a second side on a lower portion; said scales being in such physical relation to each other and to the body and the slide that said graduations are operable to calculate horizontal length as expressed by $$L=\frac{H\sec t}{f}\cdot\frac{l}{1-\frac{y_o\tan t}{f}}\cdot\sqrt{1+\frac{\Delta y^2\tan^2 s}{l^2}}$$

and an intermediate value $s$ as expressed by $$s=\text{Arc sec}\left(\frac{f}{f\cos t-y_o\sin t}\right)$$

using, in all, six operations of said slide rule; said scales being in such physical relation to each other and to the body and the slide that said graduations are operable to calculate vertical height as expressed by $$h=\frac{Hf(y_t-y_b)}{(f\cos t-y_b\sin t)(f\sin t+y_t\cos t)}$$

using, in all, five operations of said slide rule; said scales being in such physical relation to each other and to the body and the slide that said graduations are operable to calculate object space coordinates $X$ and $Y$ as expressed by $$X=\frac{Hx}{f\cos t-y\sin t}$$

and $$Y=H\frac{f\sin t+y\cos t}{f\cos t-y\sin t}$$

and using, in all, six operations of said slide rule; said scales being in such physical relation to each other and to said body and slide that said graduations are operable to calculate area of horizontal regions as expressed by $$A=\frac{H^2fa}{(f\cos t-y_g\sin t)^3}$$

using, in all, four operations of said slide rule; said scales being further in such physical relation to each other and to the said body and slide that in the calculations of said dimensions and positions each operation of the slide rule is done using scales from a single side of the slide rule, the various operations using the corresponding appropriately selected sides; said scales being in such physical relation to each other and to the body and slide that said graduations are further operable as a general purpose slide rule.

12. A slide rule as set forth in claim 11 wherein said graduated scales are so physically arranged with respect to each other and to said body and said slide that in the computation of horizontal length, $L$, by said six slide rule operations, each of said six operations is done as a single step, said six steps yielding intermediate quantities, $N$, $c_o$, $s$, $c_y^{=}$, $l_y^{=}$, in one case, and intermediate quantities, $N$, $c_o$, $u$, $c_x^{=}$, $l_x^{=}$, in a second case, and the said horizontal length, $L$, each of said five intermediate quantities and the said length, $L$, being computed from given quantities and successively computed intermediate quantities as if by a proportion, said six steps being $$\text{Step 1: } \frac{f}{H}=\frac{\sec t}{N},$$

$$\text{Step 2: } \frac{\tan t}{f}=\frac{1-c_o}{y_o},$$

if $c_o \leq \sec t$, $$\text{Step 3: } \frac{\sec t}{c_o}=\frac{\sec s}{1},$$

$$\text{Step 4: } \frac{\tan^2 s}{l^2}=\frac{c_y{}^{*2}-1}{\Delta y^2},$$

$$\text{Step 5: } \frac{l}{c_o}=\frac{l_y{}^*}{c_y{}^*},$$

$$\text{Step 6: } \frac{1}{N}=\frac{l_y{}^*}{L},$$

if $c_o > \sec t$, $$\text{Step 3A: } \frac{\sec t}{c_o}=\frac{1}{\sec u},$$

$$\text{Step 4A: } \frac{\tan^2 u}{l^2}=\frac{c_x{}^{*2}-1}{\Delta x^2},$$

$$\text{Step 5A: } \frac{l}{c_o}=\frac{l_x{}^*}{c_x{}^*},$$

$$\text{Step 6A: } \frac{\sec u}{N}=\frac{l_x{}^*}{L},$$

with the literal quantities in the numerators being set on and read from said scales on said body of said slide rule and the literal quantities in the denominators being set on and read from said scales on said slide of said slide rule; wherein, further, said graduated scales are so physically arranged with respect to each other and to said body and said slide that in the computation of vertical height, $h$, by said five slide rule operations, each of said five operations is done as a single step, said five steps yielding intermediate quantities, $N$, $c_b$, $\bar{c}_t$, $\Delta y^=$, in one case, and $N$, $c_b$, $\Delta x^=$, $\rho$, in a second case, and the said vertical height, $h$, each of said four intermediate quantities and the said vertical height being computed from given and successively computed quantities as if by a proportion, said five steps being $$\text{Step 1: } \frac{f}{H}=\frac{\sec t}{N},$$

$$\text{Step 2: } \frac{\tan t}{f}=\frac{1-c_b}{y_b},$$

if $|\Delta y| \geq |\Delta x|$, $$\text{Step 3: } \frac{\cot t}{f}=\frac{\bar{c}_t-1}{y_t},$$

$$\text{Step 4: } \frac{\Delta y}{\bar{c}_t}=\frac{\Delta y^*}{\csc t},$$

$$\text{Step 5: } \frac{c_b}{N}=\frac{\Delta y^*}{h},$$

if $|\Delta y| < |\Delta x|$, $$\text{Step 3A: } \frac{\Delta x}{c_b}=\frac{\Delta x^*}{\sec t},$$

$$\text{Step 4A: } \frac{\Delta x^*}{x_t}=\frac{\rho}{f},$$

$$\text{Step 5A: } \frac{1}{N}=\frac{\rho}{h},$$

with the literal quantities in the numerators being set on and read from said scales on said body of said slide rule and the literal quantities in the denominators being set on and read from said scales on said slide of said slide rule; wherein, further, said graduated scales are so physically arranged with respect to each other and to said body and said slide that in the computation of said object space coordinates, $X$ and $Y$, by said six operations of said slide rule, each of said six operations is done as a single step, said six steps yielding intermediate quantities $N$, $c_y$, $c_y$, $C$, and the said coordinates $X$ and $Y$, each of said four intermediate quantities and the coordinates $X$ and $Y$ being computed from given and successively computed quantities as if by a proportion, said six steps being $$\text{Step 1: } \frac{f}{H}=\frac{\sec t}{N},$$

$$\text{Step 2: } \frac{\tan t}{f}=\frac{1-c_y}{y},$$

$$\text{Step 3: } \frac{\cot t}{f}=\frac{\bar{c}_y-1}{y},$$

$$\text{Step 4: } \frac{\tan t}{1}=\frac{C}{\bar{c}_y},$$

$$\text{Step 5: } \frac{c_y}{N}=\frac{x}{X},$$

$$\text{Step 6: } \frac{c_y}{H}=\frac{C}{Y},$$

with the literal quantities in the numerators being set on and read from said scales on said body of said slide rule and the literal quantities in the denominators being set on and read from said scales on said slide of said slide rule; wherein, further, said graduated scales are so physically arranged with respect to each other and to said body and said slide, that in the computation of area, $A$, by said four slide rule operations, each of said four operations is done as a single step, said four steps yielding intermediate quantities, $N$, $c_g$, $a^=$, and the said area, $A$, each of said three intermediate quantities and the said area being computed from given and successively computed intermediate quantities as if by a proportion, said four steps being $$\text{Step 1: } \frac{f}{H}=\frac{\sec t}{N}$$

$$\text{Step 2: } \frac{\tan t}{f}=\frac{1-c_g}{y_g}$$

$$\text{Step 3: } \frac{1}{a}=\frac{\sec t}{a^*}$$

$$\text{Step 4: } \frac{N^2}{c_g{}^3}=\frac{A}{a^*}$$

with the literal quantities in the numerators being set on and read from said scales on said body of said slide rule and the said literal quantities in the denominators being set on and read from said scales on said slide of said slide rule; and wherein, further, said graduated scales are so physically arranged with respect to each other and to said body and said slide and to said sides of said body and said slide that any one step in any one of the aforementioned sets of steps requires graduated scales of only one side of said slide rule, said side of body and slide bearing all scales necessary for said step, said various steps of said various computations being computable on appropriately chosen corresponding sides of said slide rule.

UNITED STATES PATENT OFFICE
CERTIFICATE OF CORRECTION

Patent No. 3,568,922 Dated March 9, 1971

Inventor(s) Paul M. Pepper

It is certified that error appears in the above-identified patent and that said Letters Patent are hereby corrected as shown below:

Col. 3, lines 40 - 42. Change " $v_0 2$ " to --- $\dot{v}_0^2$ ---.

Col. 4, line 21. Change " $c_0$ sec t " to --- $c_0 >$ sec t --- .

Col. 4, lines 40 - 42. Change " $x^2 \tan^2 u$ " to --- $\Delta x^2 \tan^2 u$ --- :
numerator of the fraction under the radical in (14).

Col. 5, line 24. Change " $|(y_t - {}_b)|$ " to --- $|(y_t - y_b)|$ --- .

Col. 5, lines 68 - 69. Change " $\Delta x(f \tan t + y_t$ " to --- $\Delta x(f \tan t$ Col. 8, lines 2 - 3. Change " p " to --- P ---.

Col. 8, lines 6 - 7. Change " p " to --- P ---.

Col. 9, lines 64 - 67. Change " H sec $\delta x$ " to --- H sec $\delta$ x ---.

Col. 10, line 25. Change " $\delta$ 0 " to --- $\delta = 0$ ---.

Col. 10, lines 36 - 38. Change " H sec $\delta x$ " to --- H sec $\delta$ x ---.

Col. 10, lines 72 - 75. Change " a " to --- h ---.

Col. 11, lines 12 - 13. Change " y* " to --- $\Delta$y* ---.

Col. 11, lines 14 - 15. Change " $\bar{c}_b$ ." to --- $\bar{c}_t$ ---.

Col. 11, lines 16 - 18. Change " y " to --- V --- in the denominat
the formula.

Col. 14, line 38. Change " c " to --- $\bar{c}$ --- at the second occurrer

Col. 17, line 36. Change " $c^1$ " to --- $c^-$ ---.

Col. 17, line 42. Change " $c^1$ " to --- $c^-$ ---.

Col. 17, line 48. Change " $c^1$ " to --- $c^-$ --- at both instances.

Col. 17, line 60. Change " $c^1$ " to --- $c^-$ ---.

Col. 17, line 64. Change " $c^1$ " to --- $c^-$ --- at both occurrences

Col. 17, lines 67-69. Change " $1 + \frac{y}{f}$ " to --- $1 + \frac{y}{f} \cot t$ ---.

Col. 17, line 71. Delete " cot t " at the beginning of the line.

Col. 17, line 71. Change " $c^1$ " to --- $c^-$ ---.

Col. 18, line 20. Change " $c^1$ " to --- $c^-$ ---.

Col. 18, line 21. Change " $c^1$ " to --- $c^-$ ---.

Col. 18, line 30. Change " $c^1$ " to --- $c^-$ --- at both occurrences

Col. 18, lines 33 - 34. Change " $\frac{\tan}{y}\delta > 0$ " to --- $\frac{\tan \delta}{y} > 0$ -- beginning of the line.

Col. 18, line 71. Change " $c^1$ " to --- $c^-$ ---.

Col. 19, lines 72 - 75. Delete in their entirety and replace by:

$(4 + \log A) - (4 - \log B) + (4 + \log C) - (4 + \log P) = 0$ is equivalent to $\log A - (- \log B) + \log C - \log P = 0$ Col. 20, line 39. Change " B " to --- $\sqrt{B}$ ---.

Col. 20, lines 56 - 58. These lines should read :

is equivalent to $y = \tan \theta$ or $\theta = \arctan y$ ; the relation $$4 + \log \sec \Phi - (4 + \log y) = 0$$

Col. 22, line 8. Change " $c^1$ " to --- $c^-$ ---.

Col. 22, line 9. Change " C " to --- $c^+$ ---.

Col. 22, line 10. Change " $c^1$ " to --- $c^-$ ---.

Col. 22, line 15. Change " $c^1$ " to --- $c^-$ ---.

Col. 22, line 16. Change " $c^1$ " to --- $c^-$ ---.

Col. 22, line 17. Change " $c^1$ " to --- $c^-$ ---.

Col. 22, lines 21 - 22. Change " $c^=$ " to --- $c*$ ---.

Col. 22, lines 23 - 24. Change " $(c^=)2 - 1$ " to --- $(c*)^2 - 1$ ---.

Col. 22, line 37. Change " $c_y^=$ " to --- $c_y^*$ ---.

Col. 22, line 39. Change " $c_y^=$ " to --- $c_y^*$ ---.

Col. 22, line 39. Change " $c_x^=$ " to --- $c_x^*$ ---.

Col. 22, line 50. Change " $c_y^=$ " to --- $c_y^*$ ---.

Col. 22, line 50. Change " $c_x^=$ " to --- $c_x^*$ ---.

Col. 22, line 53. Change " $c_y^=$ " to --- $c_x^*$ ---.

Col. 22, line 54. Change " $c_y^=$ " to --- $c_y^*$ ---.

Col. 22, lines 56-57. Change " $\delta c_y^=$ " to --- $\delta c_y^*$ ---.

Col. 22, lines 56 - 57. Change " $c^=$ " to --- $c_y^*$ ---.

Col. 22, lines 58 - 60. Change " $\Delta c_y^*$ " to --- $\delta c_y^*$ ---.

Col. 22, line 64. Change " $/\Delta y/\ /l$ " to --- $|\Delta y|\ /\ l$ ---.

Col. 22, lines 66 - 67. Add the equation number --- (65a) --- at th end of the line at the margin.

Col. 22, lines 71 - 72. Change " $\frac{1}{\log_o 10} d(\log_o \sec s)$ " to --- $\frac{1}{\log_e 10} d(\log_e \sec s)$ ---.

Col. 23, line 26. Change " (65) " to --- (65a) ---.

Col. 23, lines 27-28. Change " $dc_y^=$ " to --- $dc_y^*$ ---.

Col. 23, lines 33 - 34. Change " $dc_y^=$ " to --- $dc_y^*$ ---.

Col. 23, line 36. Change " $c_y^=$ " to --- $c_y^*$ ---.

Col. 23, line 37. Change " $c_y^=$ " to --- $c_y^*$ ---.

Col. 23, line 39. Change " $c_x^=$ " to --- $c_x^*$ ---.

Col. 24, line 4. Change " $d\cdot(a\cdot(_{\pi\xi}))$ " to --- $d\cdot(a\cdot(bc))$ ---.

Col. 24, line 5. Change " $\gamma\cdot(_{\pi}\cdot(_{\alpha\xi}))$ " to --- $d\cdot(b\cdot(ac))$ ---.

Col. 24, line 5. Change " $\gamma\cdot((ab))$ " to --- $d\cdot(c\cdot(ab))$ ---.

Col. 24, lines 25-26. Change bold face "and" to regular font --- an

Col. 25, lines 26 - 27. Change " $c^{=}$ " to --- $c^{*}$ ---.

Col. 25, lines 49 - 50. Change " $c^{1}$ " to --- $c^{-}$ ---.

Col. 25, lines 49-50. Change " $c^{=}$ " to --- $c^{*}$ ---.

Col. 25, lines 51 - 52. Change " $c^{=}$ " to --- $c^{*}$ ---.

Col. 25, lines 53-54. Change " $c^{1}$ " to --- $c^{-}$ --- at both occurre

Col. 25, lines 55 - 56. Change " $c^{1}$ " to --- $c^{-}$ ---.

Col. 25, lines 56 - 57. Change " $c^{1}$ " to --- $c^{-}$ ---.

Col. 25, lines 57 - 58. Change " $c^{1}$ " to --- $c^{-}$ --- at both occur

Col. 25, lines 58 - 59. Change " $c^{1}$ " to --- $c^{-}$ ---.

Col. 25, line 64. Change " $c^{1}$ " to --- $c^{-}$ ---.

Col. 25, line 65. Change " $c^{1}$ " to --- $c^{-}$ ---.

Col. 25, line 71. Change " $c^{1}$ " to --- $c^{-}$ ---.

Col. 25, line 72. Change " $c^{1}$ " to --- $c^{-}$ ---.

Col. 26, line 5. Change " $c^{1}$ " to --- $c^{-}$ ---.

Col. 26, line 7. Change " $c^{1}$ " to --- $c^{-}$ ---.

Col. 26, line 7. Change " $c^{=}$ " to --- $c^{*}$ ---.

Col. 26, lines 10 - 11. Change " $c^{1}$ " to --- $c^{-}$ ---.

Col. 26, lines 10 - 11. Change " $c^{=}$ " to --- $c^{*}$ ---.

Col. 26, line 23. Change " $c^{1}$ " to --- $c^{-}$ ---.

Col. 27, line 7. Change " $c^1$ " to --- $c^-$ ---.

Col. 27, line 50. Change " $\Delta_x$ " to --- $\Delta x$ --- in the denominator of formula.

Col. 27, lines 51 - 52. Change " $lx^*$ " to --- $l_x^*$ --- at both occurr

Col. 28, line 11. Change " $c^1$ " to --- $c^-$ ---.

Col. 28, line 22. Change " $c^=$ " to --- $c^*$ ---.

Col. 28, line 24. Between " Set " and " ( " insert --- $l$ ---.

Col. 28, line 25. Change " $y^=$ " to --- $l_y^*$ ---.

Col. 28, line 27. Change " $y^=$ " to --- $l_y^*$ ---.

Col. 28, lines 33 - 34. Change " $c^=$ " to --- $c^*$ ---.

Col. 28, lines 35 - 36. Change " $cx^=$ " to --- $c_x^*$ ---.

Col. 28, lines 35 - 36. Change " $x^=$ " to --- $l_x^*$ ---.

Col. 28, lines 37 - 38. Change " $x^=$ " to --- $l_x^*$ ---.

Col. 28, lines 40 - 41. Change " c " to --- C ---.

Col. 28, lines 41 - 42. Change " $c^1$ " to --- $c^-$ ---.

Col. 28, lines 47 - 48. Change " $c^1$ " to --- $c^-$ ---.

Col. 28, lines 48 - 49. Change italic " *scale* " to regular font --- sc

Col. 28, lines 48 - 49. Change " $c = 1$ " to --- $\bar{c}_t = 1$ ---.

Col. 28, lines 49 - 50. Change " $c_t$ " to --- $\bar{c}_t$ ---.

Col.28, lines 50 - 51. Change " $csc_z$ " to --- $csc_2$ ---.

Col. 28, line 53. Change bold face " 10 " to bold face --- 16 --- at first and third occurrences.

Col. 28, line 53. Change " $y^=$ " to --- $\Delta y*$ ---.

Col. 28, line 55. Change " $sec_z$ " to --- $sec_2$ ---.

Col. 28, line 55. Change " $x^=$ " to --- $x*$ ---.

Col. 28, line 56. Change " $x^=$ " to --- $x*$ ---.

Col. 28, line 57. Change " p " to --- $\rho$ ---.

Col. 28, line 59. Change " p " to --- $\bar{\rho}$ ---.

Col. 28, line 59. Change bold face " 10 " to bold face --- 16 --- at occurrence.

Col. 28, line 63. Change " $c^1$ " to --- $c^-$ ---.

Col. 28, line 66. Change " $a^=$ " to --- $a*$ ---.

Col. 28, line 68. Change " $a^=$ " to --- $a*$ ---.

Col. 28, line 73. Change " $c^1$ " to --- $c^-$ ---.

Col. 29, line 1. Change " $c_y$ " to --- $\bar{c}_y$ ---.

Col. 29, line 1. Change " $c_+$ " to --- $c^+$ ---.

Col. 29, line 2. Change " $c^1$ " to --- $c^-$ ---.

Col. 29, line 3. Change " $c^1$ " to --- $c^-$ ---.

Col. 29, line 3. Change " $c_y$ " to --- $\bar{c}_y$ ---.

Col. 29, line 4. Change " $= Z - c$ " to --- $= 2 - c^+$ ---.

Col. 29, lines 7 - 8. Change " c " to --- C ---.

Col. 29, line 71. Change " $c^1$ " to --- $c^-$ ---.

Col. 29, line 72. Change " $c^=$ " to --- $c*$ ---.

Col. 30, line 67. Change " $c^1$ " to --- $c^-$ ---.

Col. 30, line 70. Change " $c^=$ " to --- $c*$ ---.

Col. 31, line 2. Change " $c^=$ " to --- $c*$ ---.

Col. 31, line 65. Change " $c^{=2}$ " to --- $c^{*2}$ ---.

Col. 36, line 19. Change " $c^{=}$ " to --- $c^{*}$ ---.

Col. 36, line 72. Change " $c_y^{=}$ " to --- $c_y^{*}$ ---.

Col. 36, line 72. Change " $l_y^{=}$ " to --- $l_y^{*}$ ---.

Col. 36, line 73. Change " $c_x^{=}$ " to --- $c_x^{*}$ ---.

Col. 36, line 73. Change " $l_x^{=}$ " to --- $l_x^{*}$ ---.

Col. 37, lines 27 - 28. Change " $\Delta y^{=}$ " to --- $\Delta y^{*}$ ---.

Col. 37, lines 28 - 29. Change " $\Delta x^{=}$ " to --- $\Delta x^{*}$ ---.

Col. 38, line 1. Change " $c_y$ " to --- $\bar{c}_y$ --- at second occurre

Col. 38, line 29. Change " $a^{=}$ " to --- $a^{*}$ ---.

Signed and sealed this 20th day of June 1972.

(SEAL)
Attest:

EDWARD M.FLETCHER,JR.
Attesting Officer

ROBERT GOTTSCHALK
Commissioner of Pat